(12) United States Patent
Wang et al.

(10) Patent No.: US 12,323,207 B2
(45) Date of Patent: Jun. 3, 2025

(54) BEAMFORMING FOR BACKSCATTER RADIO

(71) Applicant: QUALCOMM Incorporated, San Diego, CA (US)

(72) Inventors: Xiaojie Wang, Hillsborough, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/931,886

(22) Filed: Sep. 13, 2022

(65) Prior Publication Data

US 2024/0088957 A1 Mar. 14, 2024

(51) Int. Cl.
*H04B 7/06* (2006.01)

(52) U.S. Cl.
CPC ......... *H04B 7/0617* (2013.01); *H04B 7/0628* (2013.01)

(58) Field of Classification Search
CPC ...... H04B 7/0617; H04B 7/0628; H04B 5/77; G06K 7/10356; G06K 19/0723
See application file for complete search history.

(56) References Cited

U.S. PATENT DOCUMENTS

| | | | | |
|---|---|---|---|---|
| 6,967,612 | B1 * | 11/2005 | Gorman | G01S 13/04 342/52 |
| 7,800,527 | B2 * | 9/2010 | Douglass | G01S 13/66 342/52 |
| 7,873,326 | B2 * | 1/2011 | Sadr | H01Q 21/29 370/335 |
| 8,180,285 | B2 * | 5/2012 | Rofougaran | H01Q 1/2225 375/295 |

(Continued)

FOREIGN PATENT DOCUMENTS

| | | | | |
|---|---|---|---|---|
| CA | 2716791 | A1 * | 9/2009 | G01S 11/02 |
| CA | 2776373 | A1 * | 3/2011 | G01S 13/82 |

(Continued)

OTHER PUBLICATIONS

D. Dardari, N. Decarli, A. Guerra and F. Guidi, "The future of ultra-wideband localization in RFID," 2016 IEEE International Conference on RFID (RFID), Orlando, FL, USA, 2016, pp. 1-7, (Year: 2016).*

(Continued)

*Primary Examiner* — Berhanu Tadese
(74) *Attorney, Agent, or Firm* — Arent Fox, LLP

(57) ABSTRACT

Aspects of the disclosure are directed to an apparatus configured for wireless communication. The apparatus may include any wireless communication device configured for radio frequency identification (RFID) communications. In some examples, the apparatus includes a memory comprising instructions, and one or more processors configured to (Continued)

execute the instructions. In some examples, the one or more processors are configured to cause the apparatus to obtain a first signal from a radio frequency identifier (RFID) device. In some examples, the one or more processors are configured to cause the apparatus to output, for transmission to the RFID device in response to the first signal, a first backscatter signal configured to indicate a beamforming capability of the apparatus.

26 Claims, 16 Drawing Sheets

(56) References Cited

U.S. PATENT DOCUMENTS

| | | | | |
|---|---|---|---|---|
| 8,344,823 | B2* | 1/2013 | Bloy | H01Q 21/245 333/101 |
| 8,768,248 | B2* | 7/2014 | Sadr | G01S 13/758 370/335 |
| 8,786,440 | B2* | 7/2014 | Clare | G01S 13/82 340/572.1 |
| 8,804,612 | B1* | 8/2014 | Chen | H04B 7/0617 375/267 |
| 8,929,494 | B2* | 1/2015 | Lee | G06K 7/10356 375/150 |
| 9,014,635 | B2* | 4/2015 | Sadr | G01S 7/282 370/335 |
| 9,183,424 | B2* | 11/2015 | Koch | H01Q 1/50 |
| 9,268,981 | B2* | 2/2016 | Lee | G06K 7/10356 |
| 9,389,303 | B2* | 7/2016 | Ben Hamida | G01S 5/10 |
| 9,440,289 | B1* | 9/2016 | Spariosu | B22F 9/00 |
| 9,449,202 | B2* | 9/2016 | Clare | G06K 7/0008 |
| 9,509,061 | B2* | 11/2016 | Koch | H01Q 1/2216 |
| 9,614,604 | B2* | 4/2017 | Sadr | H01Q 3/30 |
| 9,715,609 | B1* | 7/2017 | Fink | H01Q 25/00 |
| 9,747,479 | B2* | 8/2017 | Twogood | G06K 7/10356 |
| 9,977,121 | B1* | 5/2018 | Fink | H01Q 25/00 |
| 10,652,073 | B2* | 5/2020 | Talla | H04L 25/0278 |
| 10,852,413 | B2* | 12/2020 | Sundaresan | G06K 19/0724 |
| 10,852,414 | B2* | 12/2020 | Sundaresan | G06K 19/0725 |
| 10,852,415 | B2* | 12/2020 | Sundaresan | G01S 13/751 |
| 10,852,416 | B2* | 12/2020 | Sundaresan | G06K 19/0725 |
| 10,936,927 | B2* | 3/2021 | Sundaresan | G06K 7/01 |
| 11,038,571 | B2* | 6/2021 | Lopez | H04B 5/72 |
| 11,048,890 | B2* | 6/2021 | Khojastepour | G06K 7/10029 |
| 11,321,549 | B2* | 5/2022 | Kumar | G06K 7/10178 |
| 11,373,050 | B2* | 6/2022 | Lopez | G06K 7/10009 |
| 11,379,676 | B2* | 7/2022 | Khojastepour | G06K 7/10356 |
| 11,956,805 | B2* | 4/2024 | Dutta | H04W 4/40 |
| 11,991,704 | B2* | 5/2024 | Wang | H04W 72/21 |
| 12,047,941 | B2* | 7/2024 | Wang | H04W 4/70 |
| 12,132,538 | B2* | 10/2024 | Patchava | H04B 7/06958 |
| 12,137,412 | B2* | 11/2024 | Wang | H02J 50/80 |
| 2007/0037528 | A1* | 2/2007 | Doan | H04B 7/0615 455/562.1 |
| 2008/0012710 | A1* | 1/2008 | Sadr | G01S 7/023 340/572.1 |
| 2008/0318524 | A1* | 12/2008 | Rofougaran | H01Q 1/2283 455/41.1 |
| 2011/0032079 | A1* | 2/2011 | Bloy | H01Q 21/24 235/492 |
| 2011/0090059 | A1* | 4/2011 | Sadr | G06K 7/10009 340/10.1 |
| 2014/0292492 | A1* | 10/2014 | Sadr | G01S 13/758 340/10.1 |
| 2015/0326298 | A1* | 11/2015 | Sadr | G06K 7/10009 340/10.1 |
| 2017/0177911 | A1* | 6/2017 | Sadr | H01Q 1/2216 |
| 2019/0080612 | A1* | 3/2019 | Weissman | G01S 13/758 |
| 2019/0102582 | A1* | 4/2019 | Sadr | H01Q 25/00 |
| 2019/0229770 | A1* | 7/2019 | Khaleghi | H04L 27/22 |
| 2019/0243994 | A1* | 8/2019 | Sadr | G06K 7/10128 |
| 2019/0326970 | A1* | 10/2019 | Ma | H04B 5/79 |
| 2020/0226331 | A1* | 7/2020 | Khojastepour | G06K 7/10128 |
| 2020/0259896 | A1* | 8/2020 | Sachs | H04L 67/12 |
| 2020/0302131 | A1* | 9/2020 | Sadr | G01S 13/762 |
| 2022/0163616 | A1* | 5/2022 | Rappaport | G01S 5/0268 |
| 2022/0361222 | A1* | 11/2022 | Chen | H04L 5/0053 |
| 2022/0417942 | A1* | 12/2022 | Zhang | H04W 72/569 |
| 2023/0102893 | A1* | 3/2023 | Bao | H04W 64/00 455/456.1 |
| 2023/0254886 | A1* | 8/2023 | Gupta | H02J 13/00002 370/329 |
| 2023/0268972 | A1* | 8/2023 | Zhou | H04W 76/14 370/329 |
| 2023/0291535 | A1* | 9/2023 | Wang | H04L 5/1438 |
| 2023/0327709 | A1* | 10/2023 | Wang | H04W 60/04 455/41.1 |
| 2023/0379901 | A1* | 11/2023 | Wang | H02J 13/0002 |
| 2023/0397017 | A1* | 12/2023 | Elshafie | H04W 72/23 |
| 2024/0023020 | A1* | 1/2024 | Wang | H02J 50/001 |
| 2024/0088957 | A1* | 3/2024 | Wang | G06K 19/0723 |
| 2024/0089725 | A1* | 3/2024 | Wang | H04W 48/16 |
| 2024/0107447 | A1* | 3/2024 | Wang | H02J 50/10 |
| 2024/0120967 | A1* | 4/2024 | Elshafie | H04B 7/04013 |
| 2024/0147430 | A1* | 5/2024 | Elshafie | H04W 72/11 |
| 2024/0151815 | A1* | 5/2024 | Wang | G01S 13/424 |
| 2024/0172166 | A1* | 5/2024 | Fahim | H04W 64/00 |
| 2024/0175963 | A1* | 5/2024 | Fahim | H04W 4/029 |
| 2024/0175965 | A1* | 5/2024 | Wang | H04W 24/08 |
| 2024/0175966 | A1* | 5/2024 | Fahim | H04W 24/10 |
| 2024/0176011 | A1* | 5/2024 | Fahim | G01S 13/765 |
| 2024/0176963 | A1* | 5/2024 | Fahim | G01S 13/758 |
| 2024/0179549 | A1* | 5/2024 | Fahim | H04W 56/0065 |
| 2024/0179666 | A1* | 5/2024 | Wang | H04W 4/80 |
| 2024/0183971 | A1* | 6/2024 | Wang | G01S 5/0236 |
| 2024/0185017 | A1* | 6/2024 | Wang | G06K 19/0675 |
| 2024/0187985 | A1* | 6/2024 | Abotabl | H04W 52/0216 |
| 2024/0215017 | A1* | 6/2024 | Panwar | H04W 72/23 |
| 2024/0215067 | A1* | 6/2024 | Elkotby | H04W 74/08 |
| 2024/0224184 | A1* | 7/2024 | Elshafie | H04W 52/0235 |
| 2024/0243777 | A1* | 7/2024 | Prasad | H04B 7/024 |
| 2024/0250852 | A1* | 7/2024 | Patchava | H04B 7/0626 |
| 2024/0258833 | A1* | 8/2024 | Sun | H02J 50/20 |
| 2024/0273313 | A1* | 8/2024 | Wang | G06K 7/10019 |
| 2024/0283295 | A1* | 8/2024 | Patchava | H02J 50/001 |
| 2024/0298323 | A1* | 9/2024 | Abotabl | H04W 72/1263 |
| 2024/0333556 | A1* | 10/2024 | Sun | H04J 13/0062 |
| 2024/0365152 | A1* | 10/2024 | Elshafie | H04B 17/25 |
| 2024/0393445 | A1* | 11/2024 | Wang | G01S 13/08 |
| 2024/0403578 | A1* | 12/2024 | Franzo | G06K 7/10366 |
| 2024/0421856 | A1* | 12/2024 | Patchava | H04B 7/0617 |
| 2024/0427005 | A1* | 12/2024 | Fahim | G01S 13/003 |
| 2024/0430879 | A1* | 12/2024 | Elshafie | H04W 72/20 |
| 2025/0020789 | A1* | 1/2025 | Liu | G01S 13/345 |
| 2025/0031176 | A1* | 1/2025 | Fahim | G01S 5/02 |

FOREIGN PATENT DOCUMENTS

| | | | | | |
|---|---|---|---|---|---|
| CN | 102648472 | B | * | 3/2016 | G01S 13/82 |
| CN | 106452780 | A | * | 2/2017 | H04B 5/0062 |
| CN | 105550720 | B | * | 4/2019 | G06K 17/0003 |
| CN | 106452780 | B | * | 4/2019 | H04B 5/0062 |
| CN | 102648472 | A | * | 8/2021 | G01S 13/82 |
| CN | 115882905 | A | * | 3/2023 | H02J 50/001 |
| CN | 118575388 | A | * | 8/2024 | H02J 13/00002 |
| CN | 118786710 | A | * | 10/2024 | H04W 48/12 |
| CN | 118985099 | A | * | 11/2024 | H04B 5/77 |
| CN | 119137838 | A | * | 12/2024 | H02J 50/001 |
| CN | 119156758 | A | * | 12/2024 | H02J 50/001 |
| CN | 119174087 | A | * | 12/2024 | H04B 5/79 |
| CN | 119234432 | A | * | 12/2024 | H02J 13/0002 |
| DE | 112015005525 | T5 | * | 8/2017 | B41J 15/02 |
| DE | 112015005525 | B4 | * | 11/2023 | B41J 15/02 |
| DE | 102014016367 | B4 | * | 5/2024 | G06K 7/10326 |
| DE | 102016117563 | A1 | * | 7/2024 | G01S 13/86 |
| EP | 2616833 | B1 | * | 7/2015 | G01S 5/0215 |
| EP | 1810052 | B1 | * | 1/2018 | G01S 13/04 |
| EP | 2044650 | B1 | * | 4/2019 | G01S 3/48 |
| EP | 3195183 | B1 | * | 1/2020 | G06K 7/10069 |
| EP | 3195184 | B1 | * | 7/2020 | G06K 7/10069 |

(56) References Cited

FOREIGN PATENT DOCUMENTS

| | | | | |
|---|---|---|---|---|
| EP | 3699806 A1 * | 8/2020 | | G01S 3/48 |
| EP | 4109937 A1 * | 12/2022 | | G06K 19/06028 |
| EP | 3682551 B1 * | 11/2023 | | H03F 3/608 |
| EP | 4109937 B1 * | 1/2024 | | G06K 19/06028 |
| EP | 3814979 B1 * | 2/2024 | | G06K 7/10009 |
| FR | 2996971 A1 * | 4/2014 | | H04B 1/06 |
| FR | 3024620 A1 * | 2/2016 | | G06K 7/10069 |
| FR | 3024621 A1 * | 2/2016 | | G06K 7/10069 |
| FR | 3099670 A1 * | 2/2021 | | H04B 5/0031 |
| FR | 3127586 A1 * | 3/2023 | | G01S 17/34 |
| FR | 3127820 A1 * | 4/2023 | | G01S 17/34 |
| GB | 2521910 A * | 7/2015 | | G06K 7/10326 |
| GB | 2543912 A * | 5/2017 | | G01S 13/86 |
| JP | 5086259 B2 * | 11/2012 | | H04B 7/06 |
| TW | 202135580 A * | 9/2021 | | G06K 19/06028 |
| WO | WO-2007011391 A2 * | 1/2007 | | G01S 13/04 |
| WO | WO-2009108157 A1 * | 9/2009 | | G01S 11/02 |
| WO | WO-2011035256 A2 * | 3/2011 | | G01S 13/82 |
| WO | WO-2014060278 A1 * | 4/2014 | | H04B 1/06 |
| WO | WO-2015115752 A1 * | 8/2015 | | G06K 17/0022 |
| WO | WO-2017176772 A1 * | 10/2017 | | H04L 25/0278 |
| WO | WO-2019052626 A1 * | 3/2019 | | H03F 3/608 |
| WO | WO-2019055208 A1 * | 3/2019 | | G01C 21/28 |
| WO | 2019/149341 | 8/2019 | | |
| WO | WO-2019149341 A1 * | 8/2019 | | G01S 13/751 |
| WO | WO-2019200192 A1 * | 10/2019 | | G01S 13/751 |
| WO | WO-2020005126 A1 * | 1/2020 | | G06K 7/10009 |
| WO | WO-2020146012 A1 * | 7/2020 | | G06K 7/10029 |
| WO | WO-2020159714 A1 * | 8/2020 | | H02J 50/001 |
| WO | WO-2021023928 A1 * | 2/2021 | | H04B 5/0031 |
| WO | WO-2021202847 A1 * | 10/2021 | | G06K 19/0723 |
| WO | WO-2023114576 A1 * | 6/2023 | | H04W 52/0229 |
| WO | WO-2023154623 A1 * | 8/2023 | | H02J 13/00002 |
| WO | WO-2023177514 A1 * | 9/2023 | | H04L 5/0053 |
| WO | WO-2023192799 A2 * | 10/2023 | | H04L 1/0003 |
| WO | WO-2023201153 A1 * | 10/2023 | | H04B 5/77 |
| WO | WO-2023220850 A1 * | 11/2023 | | H02J 50/00 |
| WO | WO-2023229841 A1 * | 11/2023 | | H02J 13/0002 |
| WO | WO-2023232220 A1 * | 12/2023 | | H04B 5/77 |
| WO | WO-2024015848 A1 * | 1/2024 | | H02J 50/001 |
| WO | WO-2024020915 A1 * | 2/2024 | | H02J 50/001 |
| WO | WO-2024031629 A1 * | 2/2024 | | H04W 52/242 |
| WO | WO-2024036418 A1 * | 2/2024 | | |
| WO | WO-2024059413 A1 * | 3/2024 | | |
| WO | WO-2024059419 A1 * | 3/2024 | | |
| WO | WO-2024060184 A1 * | 3/2024 | | |
| WO | WO-2024063972 A1 * | 3/2024 | | |
| WO | WO-2024081089 A1 * | 4/2024 | | |
| WO | WO-2024102196 A1 * | 5/2024 | | |
| WO | WO-2024112455 A1 * | 5/2024 | | G01N 23/203 |
| WO | WO-2024113341 A1 * | 6/2024 | | H02J 50/00 |
| WO | WO-2024118252 A1 * | 6/2024 | | G01S 13/765 |
| WO | WO-2024118253 A1 * | 6/2024 | | G01S 13/75 |
| WO | WO-2024118254 A1 * | 6/2024 | | G01S 13/765 |
| WO | WO-2024118255 A1 * | 6/2024 | | G01S 13/755 |
| WO | WO-2024118259 A1 * | 6/2024 | | G01S 5/0063 |
| WO | WO-2024118260 A1 * | 6/2024 | | G01S 13/751 |
| WO | WO-2024118261 A1 * | 6/2024 | | H04W 24/10 |
| WO | WO-2024118278 A1 * | 6/2024 | | G06K 7/0008 |
| WO | WO-2024118279 A1 * | 6/2024 | | G01S 5/0072 |
| WO | WO-2024158533 A1 * | 8/2024 | | H04B 7/0626 |
| WO | WO-2024168571 A1 * | 8/2024 | | H02J 50/00 |
| WO | WO-2024173067 A1 * | 8/2024 | | G06K 7/10019 |
| WO | WO-2024173081 A1 * | 8/2024 | | H02J 50/20 |
| WO | WO-2024183047 A1 * | 9/2024 | | H02J 50/00 |
| WO | WO-2024205793 A1 * | 10/2024 | | H04B 5/77 |
| WO | WO-2024249017 A1 * | 12/2024 | | G06K 7/10009 |
| WO | WO-2024258494 A1 * | 12/2024 | | H02J 50/001 |
| WO | WO-2024263331 A1 * | 12/2024 | | G01S 13/74 |
| WO | WO-2025006160 A1 * | 1/2025 | | H02J 50/001 |

OTHER PUBLICATIONS

M. M. Islam, K. Rasilainen, S. K. Karki and V. Viikari, "Designing a Passive Retrodirective Wireless Sensor," in IEEE Antennas and Wireless Propagation Letters, vol. 16, pp. 1739-1742, 2017, (Year: 2017).*

Deepak Mishra et al: "Multi-Tag 2 Backscattering to MIMO Reader: Channel Estimation and Throughput Fairness", arxiv.org, Cornell University Library, 201 Olin Library Cornell University Ithaca, NY 14853, Aug. 23, 2019 (Aug. 23, 2019), XP081468260.

Islam Md Mazidul et al: "Designing a Passive Retrodirective Wireless Sensor", IEEE Antennas and Wireless Propagation Letters, vol. 16, Dec. 31, 2017 (Dec. 31, 2017), pp. 1739-1742, XP011654905, Unknown ISSN: 1536-1225, DOI: 10.1109/LAWP.2017, 2671411 [retrieved on Jun. 26, 2017].

International Search Report and Written Opinion dated Dec. 13, 2023 from corresponding PCT Application PCT/US2023/072666.

* cited by examiner

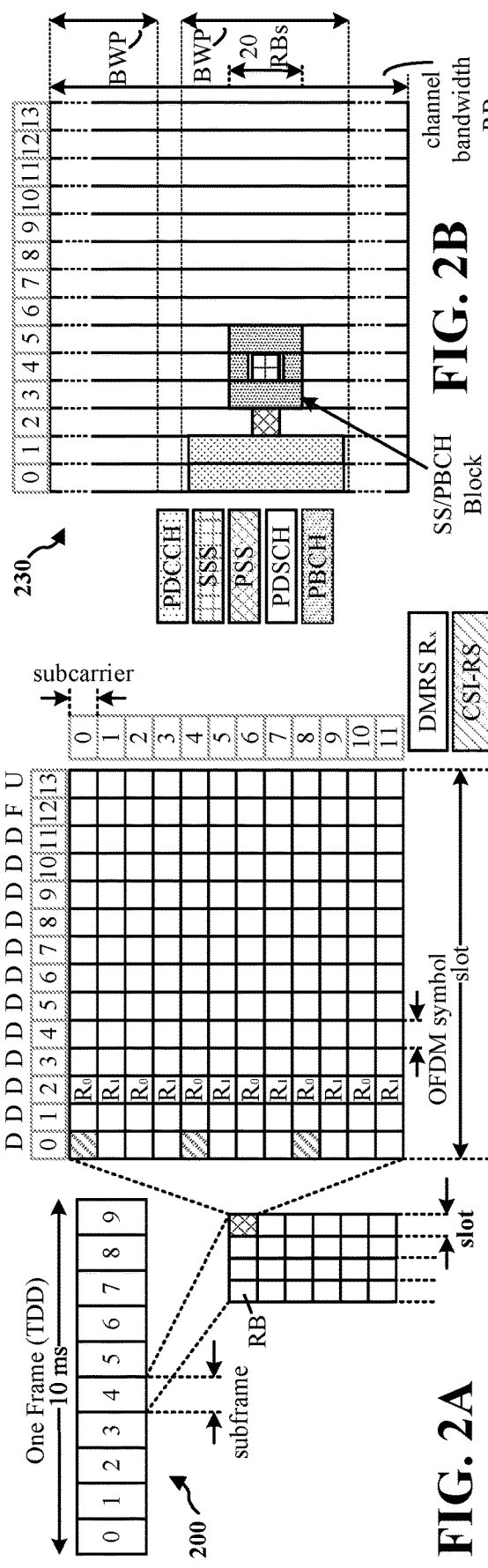
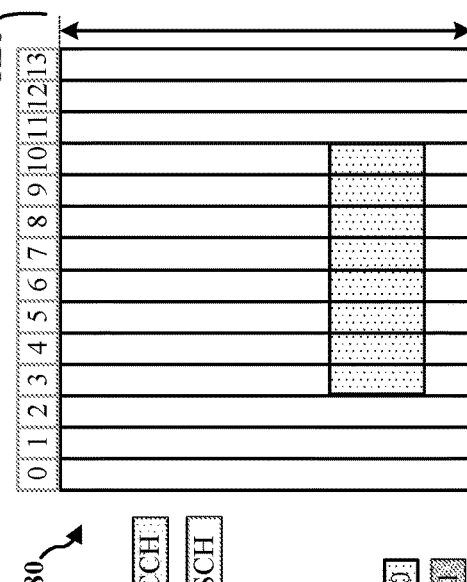
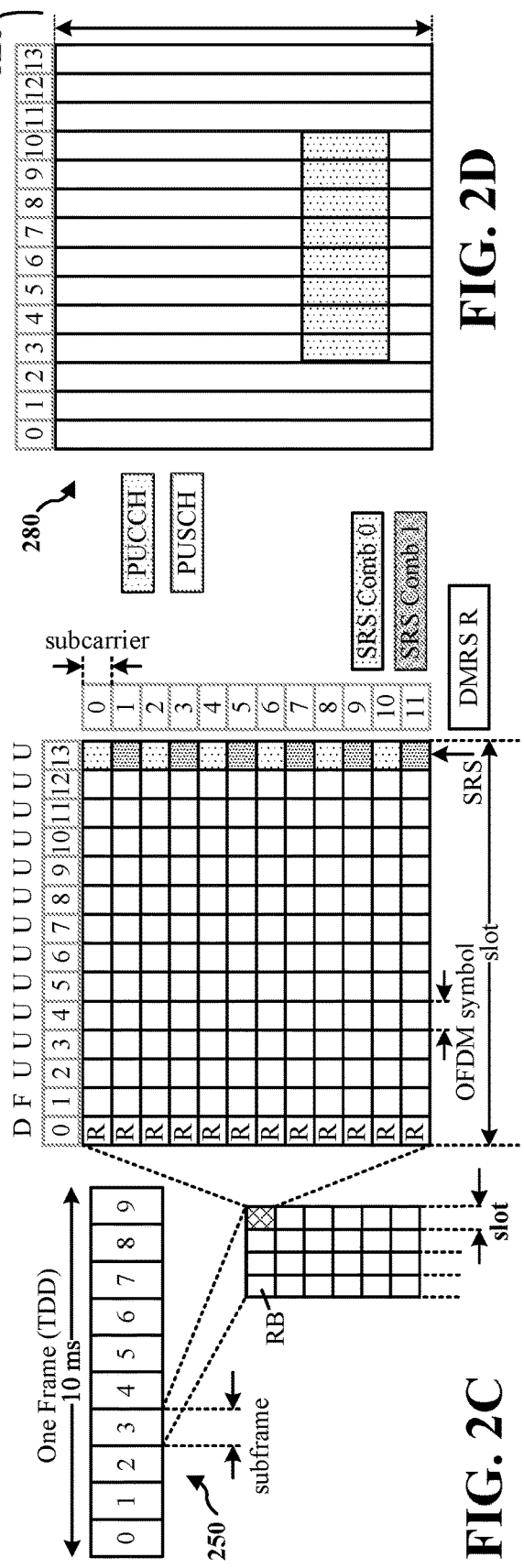
FIG. 2A
FIG. 2B
FIG. 2C
FIG. 2D

900

902
obtain a first signal from a radio frequency identifier (RFID) device

904
output, for transmission to the RFID device in response to the first signal, a first backscatter signal configured to indicate a beamforming capability of the apparatus

906
obtain, based on the first backscatter signal, signaling configured to indicate a particular beam index for a future backscatter signal

908
obtain from the RFID device, a second signal configured to indicate a mode of backscattering, wherein the mode of backscattering comprises an indication of at least one of: a particular beamforming capability of the apparatus, a particular antenna panel of the apparatus, a data rate for a future backscatter signal, a signal strength measurement of the first backscatter signal, or a range requirement of the future backscatter signal

909
output, for transmission to the RFID device, a second backscatter signal using the mode of backscattering indicated in the obtained second signal

910
obtain, from the RFID device, a second signal configured to indicate a first beamforming capability

912
switch from a second beamforming capability to the first beamforming capability in response to the second signal

FIG. 9

BEAMFORMING FOR BACKSCATTER RADIO

BACKGROUND

Technical Field

The present disclosure generally relates to communication systems, and more particularly, to beamforming for backscatter radio.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus configured for wireless communication, comprising a memory comprising instructions and one or more processors configured to execute the instructions and cause the apparatus to obtain a first signal from a radio frequency identifier (RFID) device. In some examples, the apparatus is further configured to output, for transmission to the RFID device in response to the first signal, a first backscatter signal configured to indicate a beamforming capability of the apparatus.

Certain aspects are directed to method for wireless communication by an apparatus. In some examples, the method includes obtaining a first signal from a radio frequency identifier (RFID) device. In some examples, the method includes outputting, for transmission to the RFID device in response to the first signal, a first backscatter signal configured to indicate a beamforming capability of the apparatus.

Certain aspects are directed to wireless communication by an apparatus. In some examples, the apparatus includes means for obtaining a first signal from a radio frequency identifier (RFID) device. In some examples, the apparatus includes means for outputting, for transmission to the RFID device in response to the first signal, a first backscatter signal configured to indicate a beamforming capability of the apparatus.

Certain aspects are directed to a non-transitory computer-readable medium comprising instructions that, when executed by an apparatus, cause the apparatus to perform a method. In some examples, the method includes obtaining a first signal from a radio frequency identifier (RFID) device. In some examples, the method includes outputting, for transmission to the RFID device in response to the first signal, a first backscatter signal configured to indicate a beamforming capability of the apparatus.

Certain aspects are directed to a frequency identifier (RFID) tag comprising a transceiver, a memory comprising instructions, and one or more processors configured to execute the instructions and cause the RFID tag to receive, via the transceiver, a first signal from an RFID device. In some examples, the apparatus is further configured to transmit, via the transceiver and in response to the first signal, a first backscatter signal to the RFID device, said backscatter signal being configured to indicate a beamforming capability of the RFID tag.

Certain aspects are directed to a method of wireless communication by a radio frequency identifier (RFID) tag. In some examples, the method includes receiving, via the transceiver, a first signal from an RFID device. In some examples, the method includes transmitting, via the transceiver and in response to the first signal, a first backscatter signal to the RFID device, said backscatter signal being configured to indicate a beamforming capability of the RFID tag.

Certain aspects are directed to a radio frequency identifier (RFID) tag. In some examples, the tag includes means for receiving, via the transceiver, a first signal from an RFID device. In some examples, the tag includes means for transmitting, via the transceiver and in response to the first signal, a first backscatter signal to the RFID device, said backscatter signal being configured to indicate a beamforming capability of the RFID tag.

Certain aspects are directed to a non-transitory computer-readable medium comprising instructions that, when executed by a radio frequency identifier (RFID) tag, cause the tag to perform a method. In some examples, the method includes receiving, via the transceiver, a first signal from an RFID device. In some examples, the method includes transmitting, via the transceiver and in response to the first signal, a first backscatter signal to the RFID device, said backscatter signal being configured to indicate a beamforming capability of the RFID tag.

Certain aspects are directed to an apparatus configured for wireless communication, comprising a memory comprising instructions and one or more processors configured to execute the instructions and cause the apparatus to output, for transmission to a radio frequency identifier (RFID) device, a first signal configured to request a beamforming capability of the RFID device. In some examples, the apparatus is further configured to obtain, from the RFID device, a first backscatter signal configured to indicate the beamforming capability.

Certain aspects are directed to a method for wireless communication by an apparatus. In certain aspects, the method includes outputting, for transmission to a radio frequency identifier (RFID) device, a first signal configured to request a beamforming capability of the RFID device. In some examples, the method includes obtaining, from the RFID device, a first backscatter signal configured to indicate the beamforming capability.

Certain aspects are directed to an apparatus. In certain aspects, the apparatus includes means for outputting, for transmission to a radio frequency identifier (RFID) device, a first signal configured to request a beamforming capability of the RFID device. In some examples, the apparatus includes means for obtaining, from the RFID device, a first backscatter signal configured to indicate the beamforming capability.

Certain aspects are directed to a non-transitory computer-readable medium comprising instructions that, when executed by an apparatus, cause the apparatus to perform a method. In certain aspects, the method includes outputting, for transmission to a radio frequency identifier (RFID) device, a first signal configured to request a beamforming capability of the RFID device. In some examples, the method includes obtaining, from the RFID device, a first backscatter signal configured to indicate the beamforming capability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 9 is a flowchart of a method of wireless communication.

DETAILED DESCRIPTION

Figure 1:
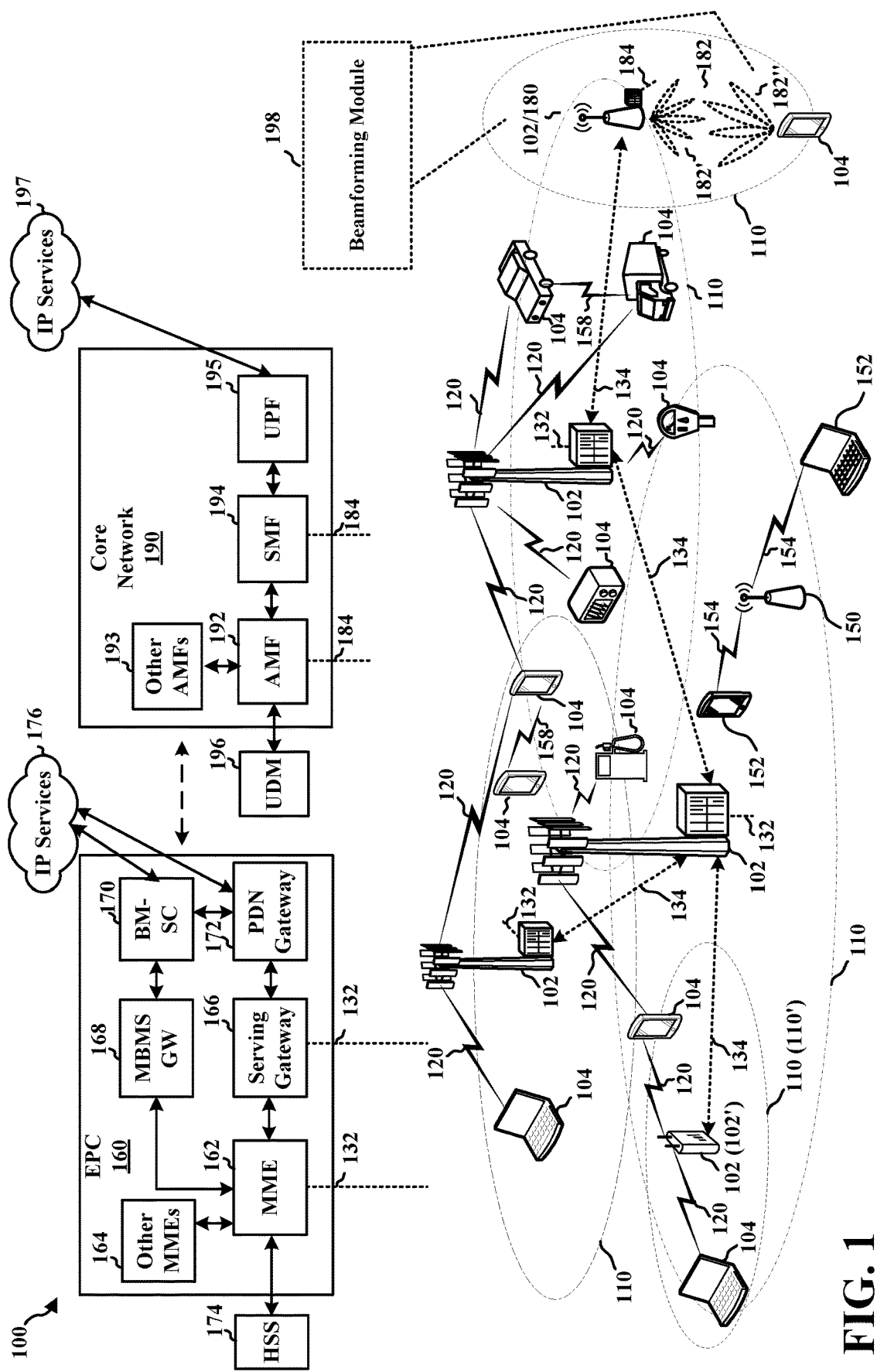
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Radio frequency identifier (RFID) is a rapidly growing technology impacting many industries due to its economic potential for inventory/asset management inside and outside warehouse, internet of things (IoT), sustainable sensor networks in factories and/or agriculture, and smart home. RFID devices may include transponders, or tags, configured to emit an information-bearing signal based on another signal (e.g., a continuous wave (CW) signal) received from another RFID device. Certain RFID devices may be operated without battery at low operational expenditure (OPEX), low-cost maintenance, and long-life expectancy. For example, passive RFID devices (e.g., tags) can harvest energy over the air and power the transmission and reception circuitry of the passive device where the transmitted signal is typically backscatter modulated. Semi-passive or active RFID devices with battery also exist, generally at a higher cost, but offer additional capabilities. It should be noted that the continuous wave signal may include commands.

Energy transfer or RF power harvesting may be performed between two or more devices. For example, an RFID reader may transmit a CW signal to an RFID tag, and the tag may use the CW signal to power its own integrated circuitry (e.g., power harvesting circuitry and RF front end). The power of the CW signal may be equal to or greater than −20 dBm (e.g., −10 dBm may be required) to "turn-on" the tag circuitry.

Tags with battery (e.g., energy storage such as a capacitor or battery) may increase reliability of RFID communications between the tag and a reader and increase the sensitivity of the power harvesting circuitry. Such tags may be referred to herein as "active tags," and may include transceiver circuitry, a power source, and a relatively broader communication range and higher complexity compared to semi-passive and passive tags. "Semi-passive tags" may include a transponder and a power source but may be limited to transmitting backscatter signaling for communications with a reader. "Passive tags" may include a transponders, but generally do not have a power source.

RFID typically supports only short-range communications (e.g., less than 10 meters for passive IoT due to insufficient link budget issues, for example). In some examples, the power link (or DL, reader to tag) is the bottleneck link because the power harvesting circuitry of the tag typically needs a high input power (e.g., −13 dBm) in order to turn on and generate a backscatter signal in response to the power link. In some cases, input power at −20 dBm or below cannot ensure satisfactory cost and conversion efficiency in RFID communications. Reflections by multipath can also cause fading to the energy signal and degrade its range.

Thus, aspects of this disclosure are directed to methods and techniques for enabling high throughput and long-range backscatter-based communication in mmWave and non-mmWave frequency ranges. That is, in some examples, the RFID reader and tag may both be configured for mmWave CW signal and backscatter signal transmission and reception. In some examples, an RFID reader may transmit a beamformed continuous wave (CW) to a tag. The tag may either absorb or reflect the signal (e.g., via on-off keying (OOK) or by applying different amplitude and phase shifts to the received CW signal to modulate QAM symbols). The reader may decode the received reflected or backscattered signal sent by the tag. To enable improved throughput and long-range communications between the reader and tag, the reflected or backscattered signal may be beamformed. In some examples, the beamforming may be retro-directive passive beamforming for backscatter signals with or without polarization conversion. A retro-directive beam relates to a beam direction that is substantially similar to a beam direction of a previously received signal. For example, if the reader CW signal is a beam having a first direction, then a backscatter signal based on the CW signal may be transmitted via a beam in the first direction. The tag may require less power for transmitting a backscatter signal via a beam, relative to an omni-directional backscatter signal.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN)

area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or base station 102/180 may be configured for RFID communications. For example, each of the UE 104 and/or base station 102/180 may be configured with a beamforming module 198 configured to obtain a first signal from a radio frequency identifier (RFID) device, and output, for transmission to the RFID device in response to the first signal, a first backscatter signal configured to indicate a beamforming capability of the apparatus. In some examples, the beamforming module 198 may also be configured to output, for transmission to a radio frequency identifier (RFID) device, a first signal configured to request a beamforming capability of the RFID device; and obtain, from the RFID device, a first backscatter signal configured to indicate the beamforming capability.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where μ is the numerology 0 to 4. As such, the numerology 1.1=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
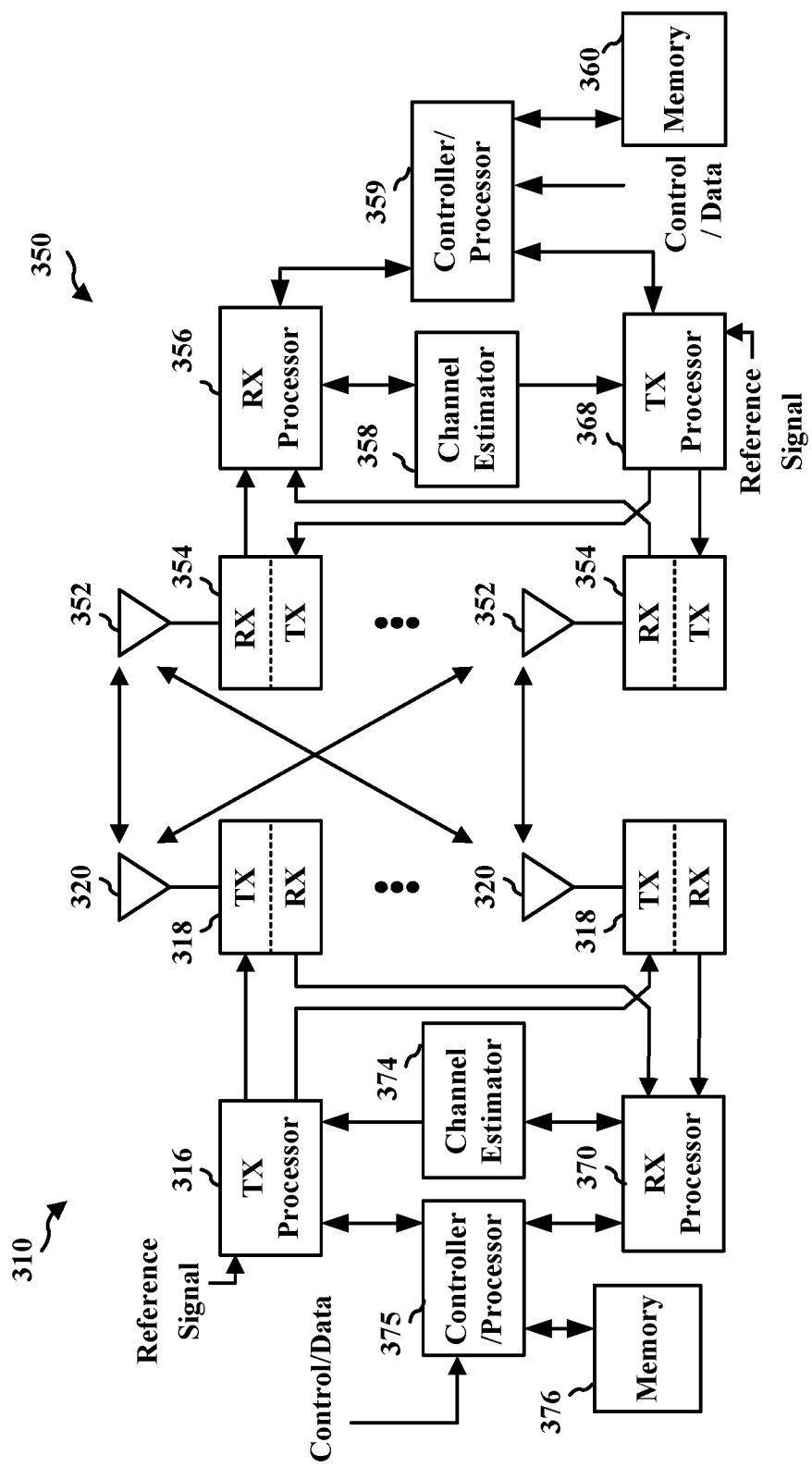
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
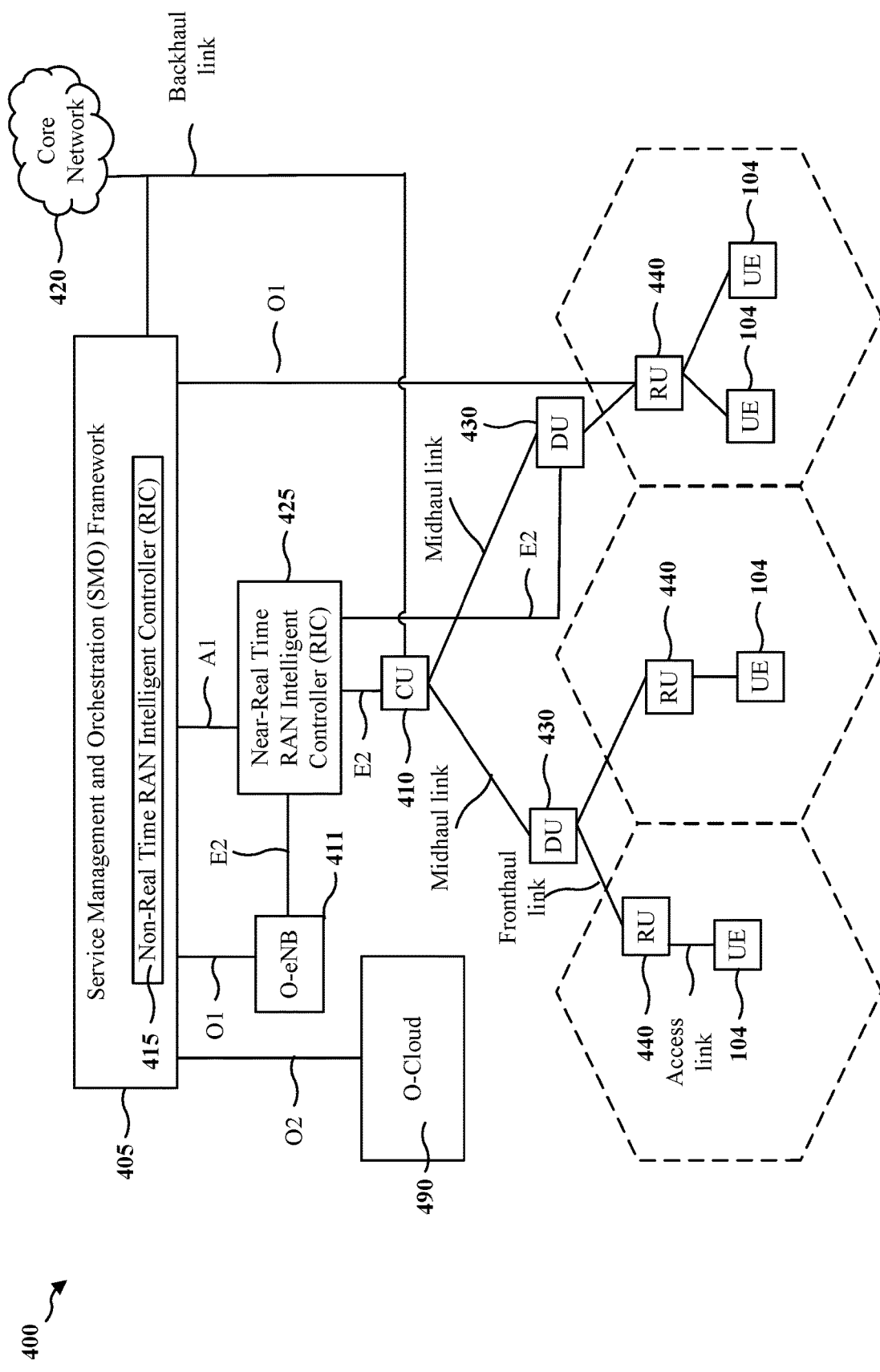
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random-access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405. The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via 01) or via creation of RAN management policies (such as A1 policies).

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 5:
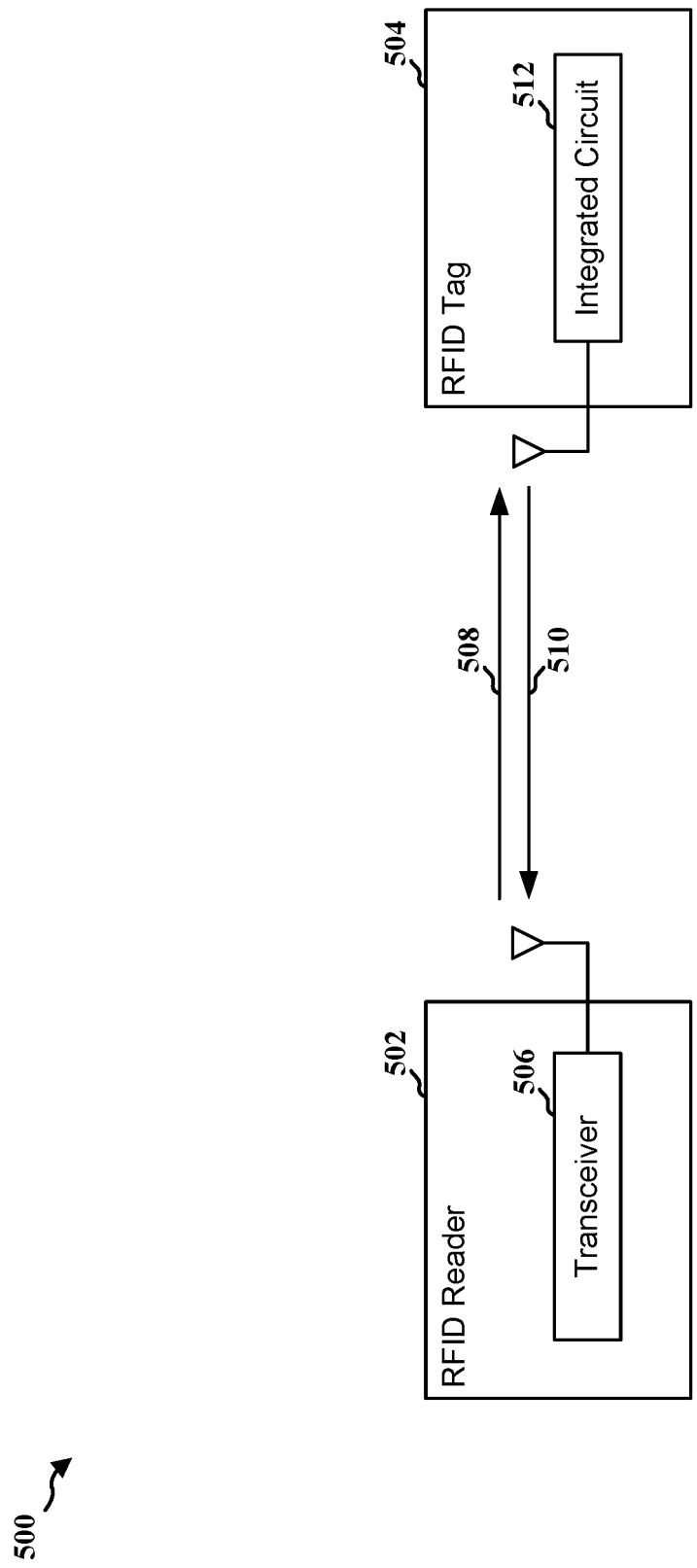
FIG. 5 is a block diagram illustrating example radio frequency identifier (RFID) reader communications with an RFID tag.

FIG. 5 illustrates a simplified block diagram of an RFID reader 502 communicating with an RFID tag 504 in a wireless communications system 500. RFID reader 502 is one possible implementation of RFID reader and may be any configured as a wireless communication node between a base station (e.g., base station 102 or a base station component illustrated in FIG. 4, a sidelink UE 104 of FIG. 1, an IAB-node, repeater, etc.) and an end user (e.g., a UE 104 of FIG. 1). The RFID reader may be implemented on an AN such as a smart repeater, an RF repeater, a reflector (e.g., intelligent reflective surface (IRS) or reconfigurable intelligent surface (RIS)), or another UE in a sidelink communication. The RFID tag 504 is one possible RFID tag associated with, for example, a passive internet of things (PIoT). Other implementations of an RFID tag include a base station or a UE.

RFID tag 504 can be either a passive, active, or battery-assisted passive. An active RFID tag has an on-board battery and periodically transmits its ID signal. A battery-assisted passive (BAP) RFID tag has a small battery on board and is activated when in the presence of RFID reader 502. A passive RFID tag is cheaper and smaller because it has no battery; instead, the passive RFID tag uses the radio energy transmitted by the RFID reader 502. However, to operate a passive RFID tag, it must be illuminated with a power level much larger than required for the passive RFID tag to transmit a signal transmission.

RFID tag 504 may either be read-only, having a factory-assigned serial number that is used as a key into a database, or may be read/write, where object-specific data can be written into the tag by the system user. Field programmable tags may be write-once, read-multiple; "blank" tags may be written with an electronic product code by the user.

RFID tag 504 may contain at least two parts: (1) an integrated circuit 512 for storing and processing information, modulating and demodulating a received RF signal, collecting DC power from the incident reader signal, generating a backscatter modulated information signal, and other specialized functions; and (2) an antenna for receiving and transmitting the backscatter modulated information signal 510. The tag information may be stored in a non-volatile memory contained in the RFID tag 504. The RFID tag 504 may include either fixed or programmable logic for processing the transmission and sensor data, respectively.

Figure 6:
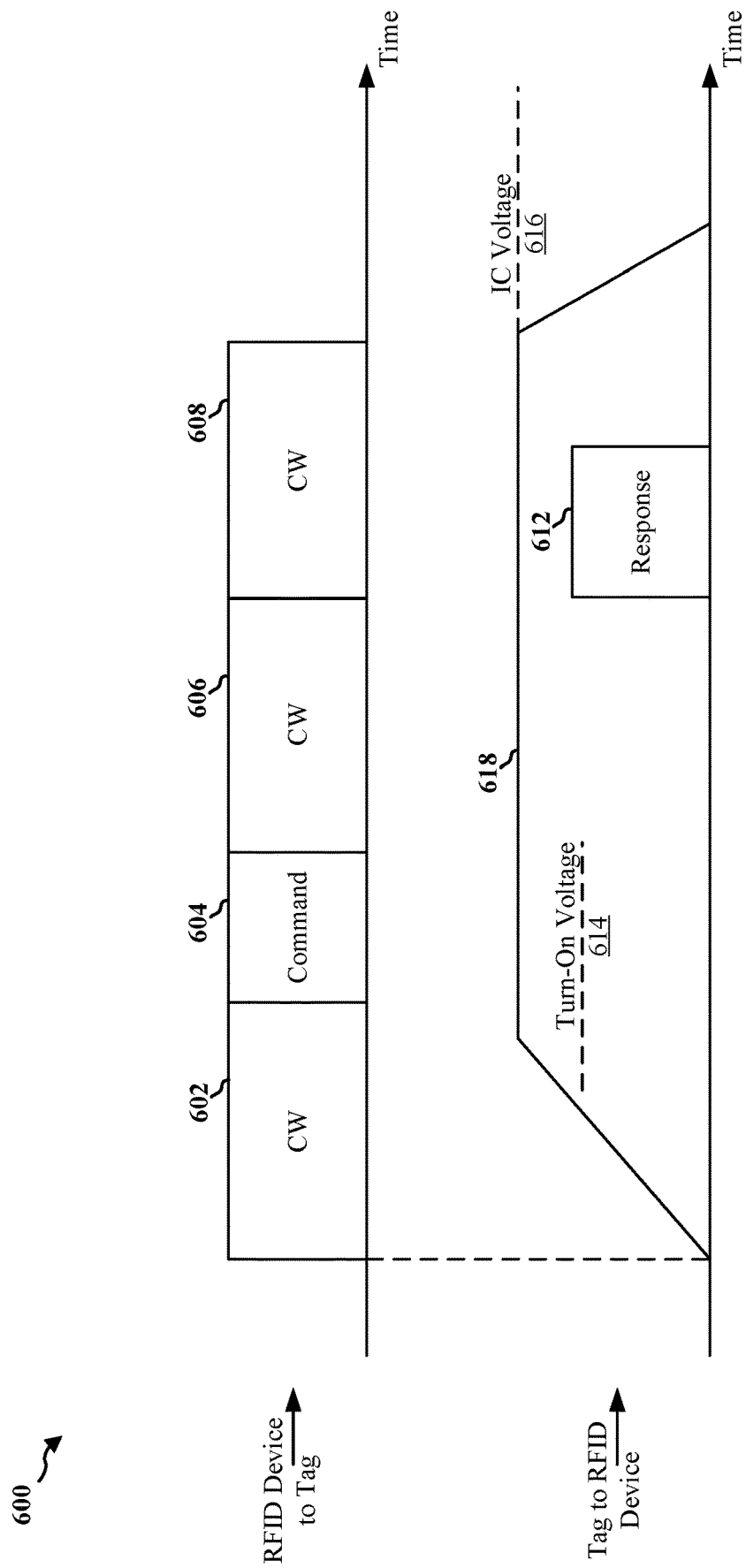
FIG. 6 is a block diagram illustrating example communication signals between an RFID device and a tag.

The transceiver 506 of the RFID reader 502 transmits one or more messages by way of a continuous RF wave 508 to energize and interrogate the RFID tag 504. Although FIG. 5 illustrates transceiver 506 as transmitting one continuous RF wave 508, in other aspects the transceiver 506 may be configured to generate multiple continuous RF waves. The RFID tag 504 receives the message and then responds with its identification and other information by generating a backscatter modulated information signal 510. The identification may be a unique tag serial number, and the other information may be product-related information such as a stock number, lot or batch number, production date, or other specific information. Since RFID tags 504 have individual serial numbers, the RFID reader 502 can discriminate among several tags that might be within the range of the RFID reader 502 and read them simultaneously. A passive RFID tag generates the backscatter modulated information signal 510 by reflecting back a portion of the continuous RF wave 508 in a process known as backscatter. Thus, the frequency of the backscatter modulated information signal 510 is determined by the frequency of the continuous RF wave 508. That is, in one example the frequency of the backscatter modulated information signal 510 is equal to the frequency of the continuous RF wave 508 received at the RFID tag 504. FIG. 6 is a block diagram illustrating example communication signals 600 between an RFID device (e.g., reader 502 of FIG. 5) and a tag (e.g., tag 504 of FIG. 5). Initially, the RFID device may transmit a first CW 602 to the tag in order to power up the tag. In one example, the first CW 602 may be equal to or greater than 400 µs in duration. The first CW 602 may provide the tag with enough power to reach a minimum turn-on voltage 614 required by the tag and a minimum IC voltage 616 to power an integrated circuit of the tag. A power level 618 is illustrated to show an example power level provided by the transmitted signaling of the RFID device.

After the first CW 602, the RFID device may transmit a first command 604 that carries information for programming the tag and/or for modulation and backscattering by the tag. The first command may also provide enough power to maintain the minimum required IC voltage 616.

A second CW 606 and a third CW 608 may be transmitted to maintain power at the tag while the tag modulates and transmits a backscatter response 612. To one or more of the CWs and/or the command 604. In some examples, the CWs, command 604, and the backscatter response 612 may be transmitted using directional beams. As used herein, a CW signal may relate to a contiguous signal that contains both CW and command elements, as illustrated in FIG. 6, or a contiguous signal containing only CW elements.

Examples of RFID Beamforming

Aspects of this disclosure are directed to methods and techniques for enabling high throughput and long-range backscatter-based communication using beamformed CW and tag signals. That is, in some examples, the tag may be configured for beamformed reflection and/or beamformed backscattering signals.

Figure 7A:
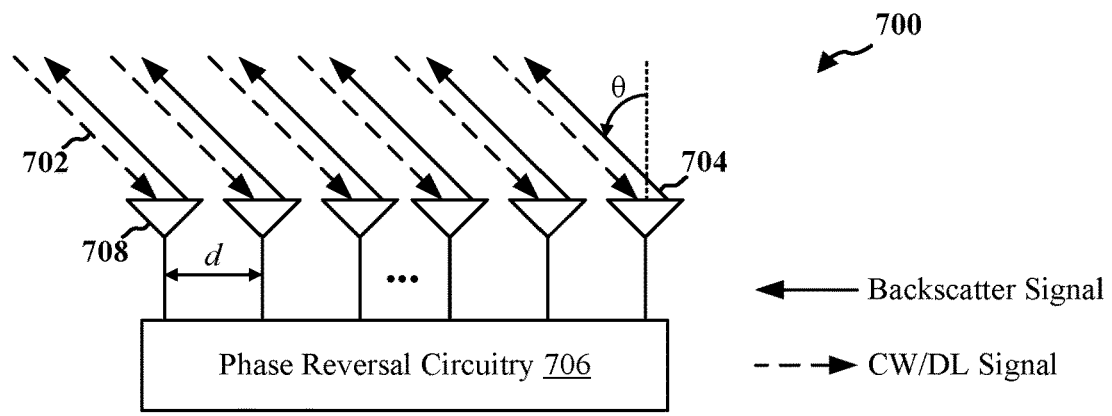
FIGS. 7A-7C are block diagrams illustrating example antenna arrays of RFID tags.

FIG. 7A is a block diagram illustrating an example antenna array (e.g., antenna panel) 700 of an RFID tag (e.g., RFID tag 504 of FIG. 5) with an active beamforming network.

Here, a first signal 702 (e.g., a CW signal) is received from an RFID reader (e.g., RFID reader 502 of FIG. 5). The first signal 702 is received by multiple antenna elements 708 of the antenna array 700. Here, each instance of the first signal 702 that is incident to the multiple antenna elements 708 is received at a particular angle θ. The first signal 702 may be a beamformed signal.

In this example, the tag may include retro-directive array circuitry or "phase reversal circuitry" 706. The circuitry 706 may function as an active beamforming network by applying different phase shifts to an incident signal in order to generate and transmit a reflected or backscattered signal in a desired direction. Hence, the circuitry 706 may be configured to direct a second signal 704 into multiple different directions (e.g., using multiple different beams). Here, the circuitry 706 may be configured to generate and transmit the second signal 704 back in the same direction as the first signal 702 without any a priori knowledge of the angle of the first signal. Thus, the second signal 704 (e.g., the reflected or backscattered signal) may be transmitted in the same direction having the same relative angle θ. Accordingly, the phase reversal circuitry 706 is configured to implement retro-directive transmissions by applying phase difference reversal characteristics to the first signal 702 to generate the second signal 704.

Accordingly, the tag may be configured to obtain the first signal 702 from the RFID device, then generate a second signal 704 (e.g., a reflective signal or a backscatter signal using the second signal). Here, the circuitry 706 may apply a phase shift to the second signal 704, wherein the phase shift is based on the first signal 702. For example, the phase shift may be made so that the second signal 704 is transmitted in the same direction as the first signal 702. In some examples, the first signal 702 may indicate a beam index associated with a particular phase shift. In such an example, the phase shift may be made according to the beam index. The circuitry 706 may then output for transmission the second signal via a beam defined by the phase shift.

Figure 7B:
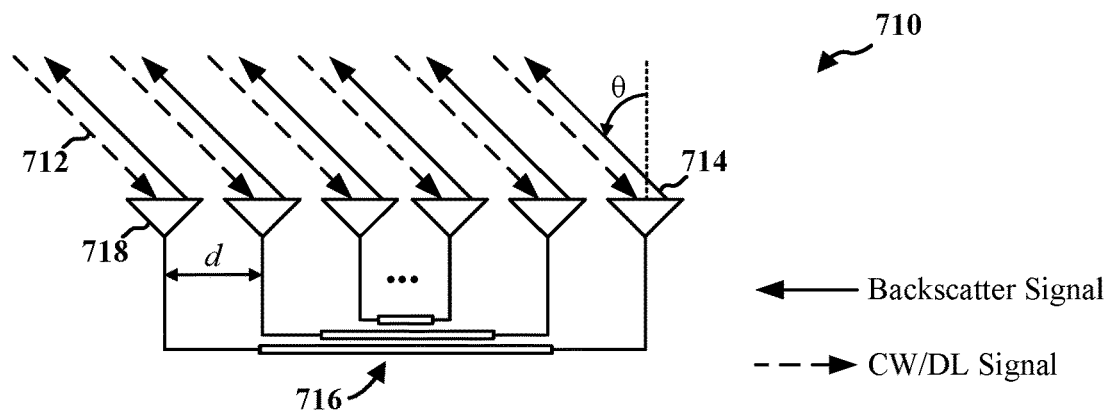

FIG. 7B is a block diagram illustrating an example antenna array 710 of an RFID tag (e.g., RFID tag 504 of FIG. 5) with a passive beamforming network.

Here, a first signal 712 (e.g., a CW signal) is received from an RFID reader (e.g., RFID reader 502 of FIG. 5). The first signal 712 is received by multiple antenna elements 718 of the antenna array 710. Here, each instance of the first signal 712 that is incident to the multiple antenna elements 718 is received at a particular angle θ. The first signal 712 may be a beamformed signal.

In this example, the antenna array 710 is configured as a Van Atta array that includes antennas elements 718 connected in pairs 716 that retro-reflect incident signaling (e.g., the first signal 712). In some examples, the antenna pairs 716 may be defined as equal phase transmission lines. Here, each antenna pair may be connected to a switch (e.g., single-pole single-throw (SPSD)) that enables the tag to generate a transmit a second signal 714 based on a change the amplitude and/or phase of the first signal 712. The connected pairs 716 may be configured to generate and transmit the second signal 714 back in the same direction as the first signal 712 without any a priori knowledge of the angle of the first signal.

Accordingly, the tag may be configured to obtain, via the antenna array 710, the first signal 712 from the reader, wherein the first signal 712 is received via a first beam having a first direction. The connected pairs 716 may be configured to generate a second signal 714 using the first signal 712, wherein the generation applies a retro-directive phase shift to the second signal 714. The tag may then output for transmission the second signal 714 via a second beam having the same first direction as the first signal 712.

Figure 7C:
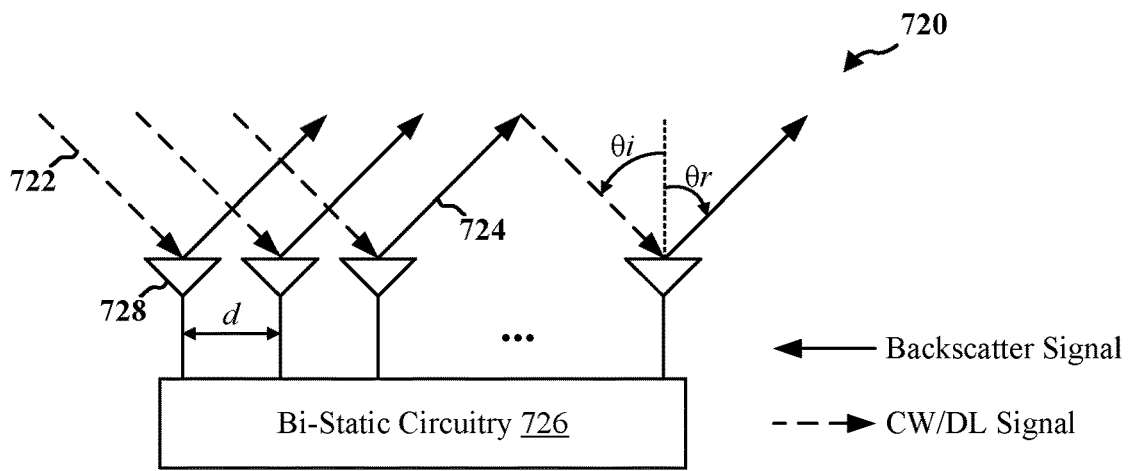

FIG. 7C is a block diagram illustrating an example antenna array 720 of an RFID tag (e.g., RFID tag 504 of FIG. 5) configured to function as a reflective mirror.

Here, a first signal 722 (e.g., a CW signal) is received from an RFID reader (e.g., RFID reader 502 of FIG. 5). The first signal 722 is received by multiple antenna elements 728 of the antenna array 720. Here, each instance of the first signal 722 that is incident to the multiple antenna elements 728 is received at a particular angle θ. The first signal 722 may be a beamformed signal.

In this example, the antenna array 720 may be configured for bi-static scenarios. For example, the tag may function as an intermediary (e.g., a relay or repeater) for communications between two other devices. Accordingly, a signal received from a device may be reflected in a directed beam to another device. The direction of the beam used to reflect the signal may depend on the angle of arrival of the received signal.

For example, the tag may receive a first signal 722 having a first angle (θi). In some examples, the bi-static circuitry 726 may be configured to modulate data contained in the first signal 722 such that a second signal 724 generated and transmitted by the tag includes information from the tag. The second signal 724 may be reflected at a second angle (θr).

Accordingly, in some examples, the tag may be configured to obtain a first signal 722 from a first RFID device (e.g., a reader) via an antenna array 720. The circuitry 726 may be configured to generate a second signal 724 using the first signal 722, wherein the generating the second signal 724 includes applying a phase shift to the second signal 724, wherein the phase shift is configured to bias transmission of the second signal 724 in a direction reflective of the first signal 722. The circuitry 726 may be further configured to output for transmission the second signal 724 via a second beam defined by the phase shift.

In some examples, any of the antenna arrays discussed above may be configured to support omni-directional reflection. For example, the antenna array may simply be configured to receive a first signal and generate and transmit a second signal in an omni-direction.

Figure 8:
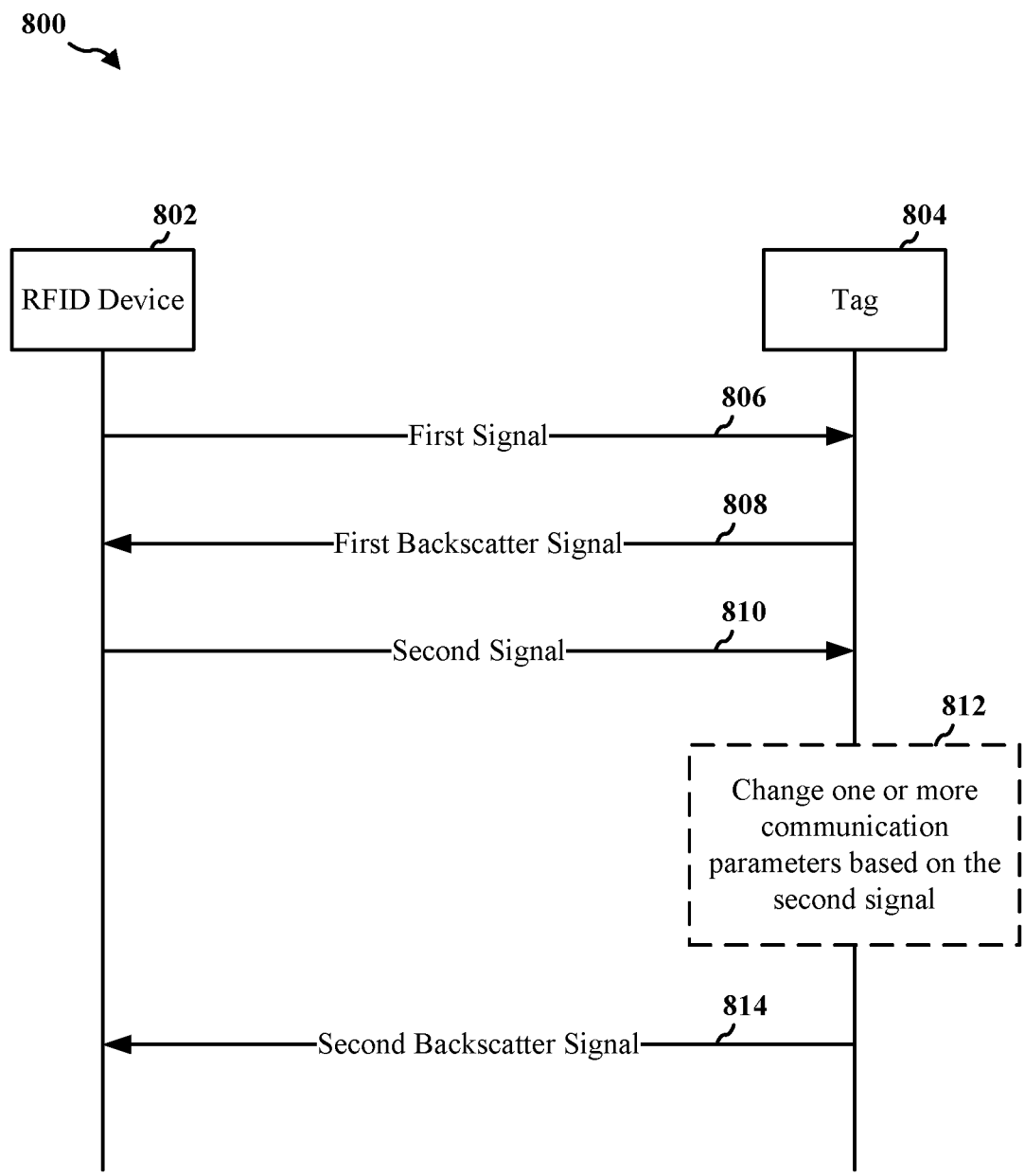
FIG. 8 is a call-flow diagram illustrating example communication between an RFID device and a tag.

FIG. 8 is a call-flow diagram illustrating example communication 800 between an RFID device 802 (e.g., RFID reader 502 of FIG. 5) and a tag 804 (e.g., RFID tag 504 of FIG. 5). It should be noted that an RFID tag may also be referred to as an RFID device in some examples. The following communications are directed to transmitting, from the tag 804, an indication of a beamforming capability of the tag 804. This provides the RFID device 802 with information about the tag's 804 beamforming capabilities, and may change how the RFID device 802 communicates with the tag 804.

Initially, the RFID device 802 may transmit a CW signal to the tag 804 in a first communication 806. The CW signal may include both CW aspects and command aspects. For example, the CW signal may include a command requesting information about the tag's 804 beamforming capabilities.

In response to the first communication 806, the tag 804 may transmit a first backscatter signal to the RFID device 802 indicating its beamforming network capabilities in a second communication 808. The tag 804 may generate the first backscatter signal based on the CW signal of the first communication. The first backscatter signal may indicate one or more beamforming capabilities, such as: an active beamforming network, a passive beamforming network (e.g., Van Atta), a signal mirroring capability, and/or an omni-directional backscattering capability. It should be noted that each beamforming capability may be indicated as bi-static and/or mono-static. In some examples, the beamforming capabilities may include a number of antenna elements of the tag 804 and/or an antenna panel report of the tag.

The antenna panel report may include an indication of a first antenna panel configured for a first beamforming capability and a second antenna panel configured for a second beamforming capability. That is, the tag 804 may include multiple antenna panels, each having one or more antenna elements, wherein each antenna panel is separately configured for one or more beamforming capabilities relative to another antenna panel. For example, a first antenna panel of the tag 804 may be configured with an active beamforming network, a second antennal panel may be configured with a passive beamforming network, and a third antenna panel may be configured with a signal mirroring capability. Thus, the tag 804 may support one or multiple beamforming networks.

In some examples, the tag 804 may determine a recommended beamforming network, antenna panel, and/or beam direction to be used for communication with the RFID device 802. The tag 804 may then include the recommendation in the first backscatter signal. In some examples, the tag 804 may base the recommendation on an energy state of a battery of the tag 804 (e.g., the tag may recommend using a panel with a passive beamforming network for energy saving if the battery is low), an amount of power received via the CW signal received from the RFID device 802, and/or beamforming capabilities of the tag 804.

In a third communication 810, the RFID device 802 may transmit a second signal to the tag 804 with a command or additional information based on the first backscatter signal.

In one example, the RFID device 802 may determine to supply a higher RF power to the tag 804 based on the first backscatter signal. For example, if the first backscatter signal indicates that the tag 804 is configured with an active beamforming network (e.g., which requires more power than a passive beamforming network), the RFID device 802 may determine to provide additional power to the tag 804 so that the tag 804 has enough power to communicate with the RFID device 802 using the active beamforming network. Alternatively, the RFID device 802 may determine to reduce its transmit power if the tag 804 is only capable of using a beamforming capability that requires less power, or if the RFID device 802 requests that the tag 802 use a beamforming capability that requires less power.

In another example, the RFID device 802 may use the first backscatter signal 808 to determine a number of antenna elements available at the tag 804 in order to estimate a beamforming gain and adapt transmission power and data rate at the RFID device 802 based on the beamforming gain. For example, the first backscatter signal may include an indication of a maximum data rate at the tag 804.

In some examples, the RFID device 802 may determine a mode of backscattering (e.g., a particular beamforming network capability of the tag, a data rate, a signal strength, and a range) based on the first backscatter signal 808. The RFID device 802 may use the second signal to transmit an indication of the mode of backscattering to the tag 804 in order that the tag 804 apply the determined mode of backscattering for future communications with the RFID device 802.

In some examples, the RFID device 802 may include an indication in the second signal of a particular beam (e.g., a beam index) that the tag 804 is to use for future communications with the RFID device 802. In some examples, the RFID device 802 may include an indication in the second signal of a particular beamforming network and/or antenna panel at the tag 804 for measurement purposes (e.g., to measure signal strength of different beamforming network of the tag).

At a first process 812, the tag 804 may make any changes to one or more communication parameters and/or its RF front end requested by the RFID device 802 in the second signal. At a fourth communication 814, the tag 804 may transmit a backscattered signal to the RFID device 802 according to any request(s) for communication adjustment included in the second signal.

FIG. 9 is a flowchart 900 of a method of wireless communication. The method may be performed by an RFID tag (e.g., the tag 504 of FIG. 5; the apparatus 1402). Any one or more of the steps of FIG. 9 may be performed in combination with any of the steps illustrated in FIGS. 10-13. At 902, the tag may obtain a first signal from a radio frequency identifier (RFID) device. For example, 902 may be performed by a receiving component 1440 of FIG. 14. Here, the tag may receive a CW signal from an RFID device, such as a reader, as illustrated in the first communication 806 of FIG. 8.

At 904, the tag may be configured to output, for transmission to the RFID device in response to the first signal, a first backscatter signal configured to indicate a beamforming capability of the tag. For example, 904 may be performed by a transmitting component 1442 of FIG. 14. Here, the tag may use the received CW signal to generate a backscatter signal and transmit the signal to the RFID device. The signal may include an indication of a beamforming capability of the tag, as illustrated and described in connection to the second communication 808 of FIG. 8.

At 906, the tag may optionally obtain, based on the first backscatter signal, signaling configured to indicate a particular beam index for a future backscatter signal. For example, 906 may be performed by the receiving component 1440 of FIG. 14. Here, the tag RFID device may determine a particular beam and transmit, for example a beam index to the tag. The beam may be selected by the RFID device based on information provided in the second communication 808 illustrated and described above in connection with FIG. 8.

At 908, the tag may optionally obtain, from the RFID device, a second signal configured to indicate a mode of backscattering, wherein the mode of backscattering comprises an indication of at least one of: a particular beamforming capability of the apparatus, a particular antenna panel of the apparatus, a data rate for a future backscatter signal, a signal strength measurement of the first backscatter signal, or a range requirement of the future backscatter signal. For example, 908 may be performed by the receiving component 1440 of FIG. 14. Here, the tag RFID device may determine a particular mode for transmitting a backscattering signal (e.g., any one or more of the parameters discussed in connection with FIG. 8) based on the information contained in the second communication 808 described above.

At 909, the tag may optionally output, for transmission to the RFID device, a second backscatter signal using the mode of backscattering indicated in the obtained second signal. For example, 910 may be performed by the transmitting component 1442 of FIG. 14. Here, the tag may transmit a backscatter a signal using a directional beam, wherein the backscatter signal is defined by the mode of backscattering indicated by the RFID device.

At 910, the tag may optionally obtain, from the RFID device, a second signal configured to indicate a first beamforming capability. For example, 910 may be performed by the receiving component 1440 of FIG. 14. Here, the RFID device may determine a particular beamforming capability for the tag to use based on the information contained in the second communication 808 described above. The RFID device may then transmit an indication of the beamforming capability, and the tag may use the indicated beamforming capability in a future communication.

At 912, the tag may optionally switch from a second beamforming capability to the first beamforming capability in response to the second signal. For example, 912 may be performed by the switching component 1444 of FIG. 14. Here, the tag may switch from a current beamforming capability to the beamforming capability indicated in the second signal, as illustrated in connection with the first process 812 of FIG. 8. In certain aspects, the tag may optionally obtain, from the RFID device, a second signal configured to indicate a first antenna panel of the apparatus. For example, obtaining the second signal may be performed by the receiving component 1440 of FIG. 14. Here, the tag RFID device may determine a particular antenna panel for the tag to use for communications with the RFID device based on the information contained in the second communication 808 described above. The RFID device may then transmit an indication of the antenna panel, and the tag may use the indicated panel in a future communication.

In certain aspects, the tag may optionally switch from a second antenna panel of the apparatus to the first antenna panel in response to the second signal. For example, the switching may be performed by the switching component 1444 of FIG. 14. Here, the tag may switch from a current antenna panel to the antenna panel indicated in the second signal, as illustrated in connection with the first process 812 of FIG. 8.

In certain aspects, the beamforming capability is indicative of at least one of a mono-static beamforming capability or a bi-static capability.

In certain aspects, the beamforming capability is indicative of at least one of a number of antenna elements or a number of antenna panels associated with the apparatus, wherein each of the antenna panels comprises at least one antenna element.

In certain aspects, the beamforming capability comprises an antenna panel report of the apparatus.

In certain aspects, the antenna panel report comprises an indication of a first antenna panel configured for a first beamforming capability and a second antenna panel configured for a second beamforming capability.

In certain aspects, the beamforming capability comprises a recommended beamforming capability for a future backscatter signal, and wherein the recommended beamforming capability is based on one or more communication metrics of the apparatus.

In certain aspects, the one or more communication metrics include a power state of the apparatus or a measured energy level of the first signal.

In certain aspects, the second signal comprises an indication of a beam index, and wherein the phase shift is based on the beam index.

Figure 10:
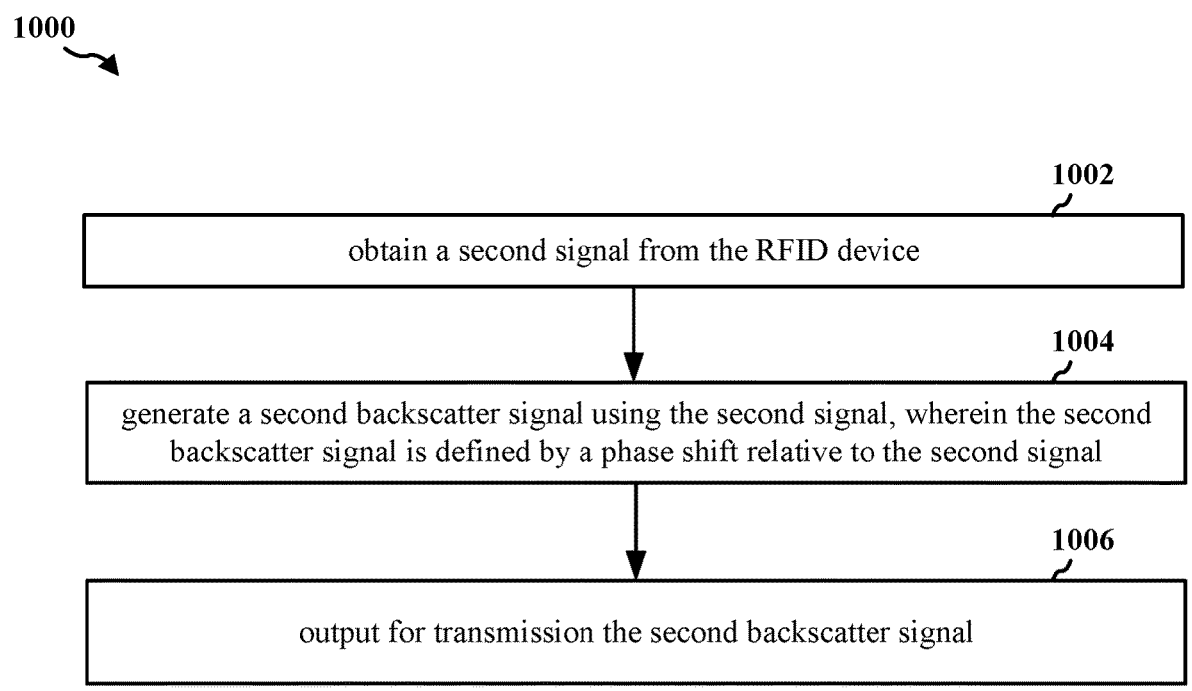
FIG. 10 is a flowchart of a method of wireless communication.

FIG. 10 is a flowchart 1000 of a method of wireless communication. The method may be performed by an RFID tag (e.g., the tag 504 of FIG. 5; the apparatus 1402). Any one or more of the steps of FIG. 10 may be performed in combination with any of the steps illustrated in FIGS. 9 and 11-13. At 1002, the tag may obtain a obtain a second signal from the RFID device, as illustrated in the third communication 810 of FIG. 8. For example, 914 may be performed by the receiving component 1440 of FIG. 14.

At 1004, the tag may generate a second backscatter signal using the second signal, wherein the second backscatter signal is defined by a phase shift relative to the second signal. For example, 1004 may be performed by the generating component 1446 of FIG. 14.

At 1006, the tag may output for transmission the second backscatter signal. For example, 1006 may be performed by the transmitting component 1442 of FIG. 14.

Figure 11:
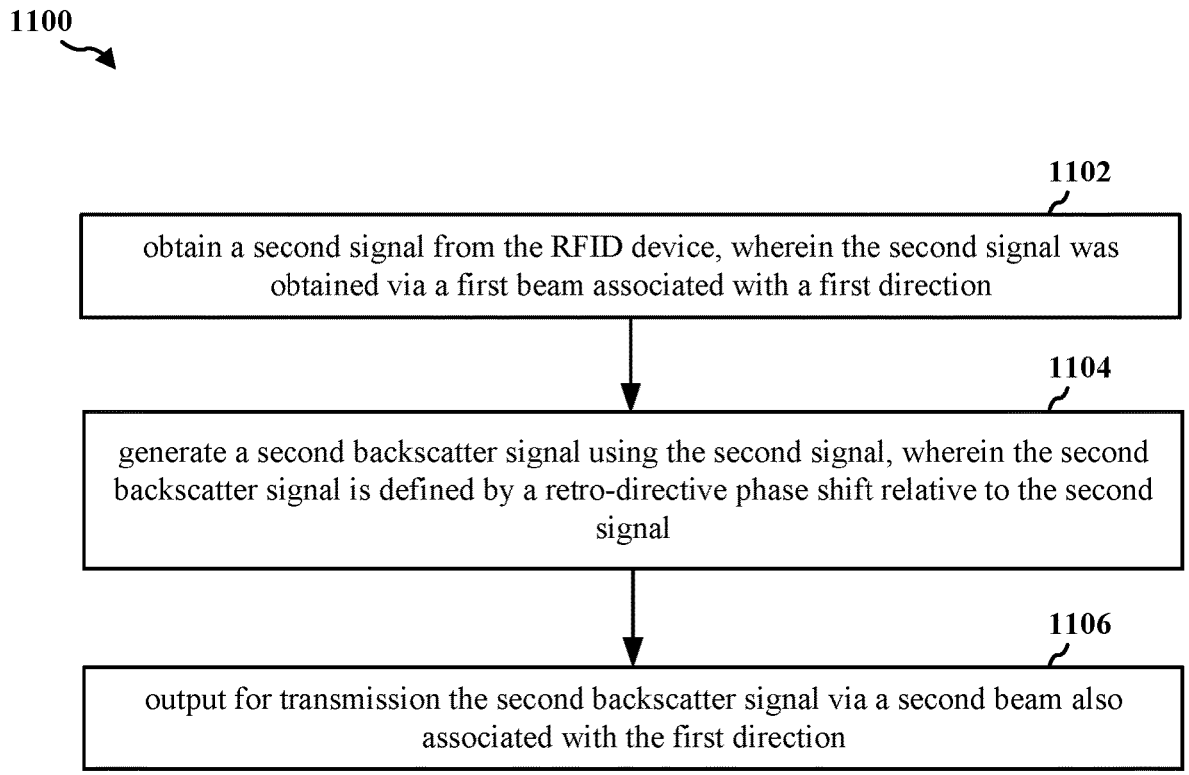
FIG. 11 is a flowchart of a method of wireless communication.

FIG. 11 is a flowchart 1100 of a method of wireless communication. The method may be performed by an RFID tag (e.g., the tag 504 of FIG. 5; the apparatus 1402). Any one or more of the steps of FIG. 11 may be performed in combination with any of the steps illustrated in FIGS. 9, 10, 12, and 13. At 1102, the tag may obtain a second signal from the RFID device, wherein the second signal was obtained via a first beam associated with a first direction, as illustrated in the third communication 810 of FIG. 8. For example, 1102 may be performed by the receiving component 1440 of FIG. 14.

At 1104, the tag may generate a second backscatter signal using the second signal, wherein the second backscatter signal is defined by a retro-directive phase shift relative to the second signal. For example, 1104 may be performed by the generating component 1446 of FIG. 14.

At 1106, the tag may output for transmission the second backscatter signal via a second beam also associated with the first direction. For example, 1106 may be performed by the transmitting component 1442 of FIG. 14.

Figure 12:
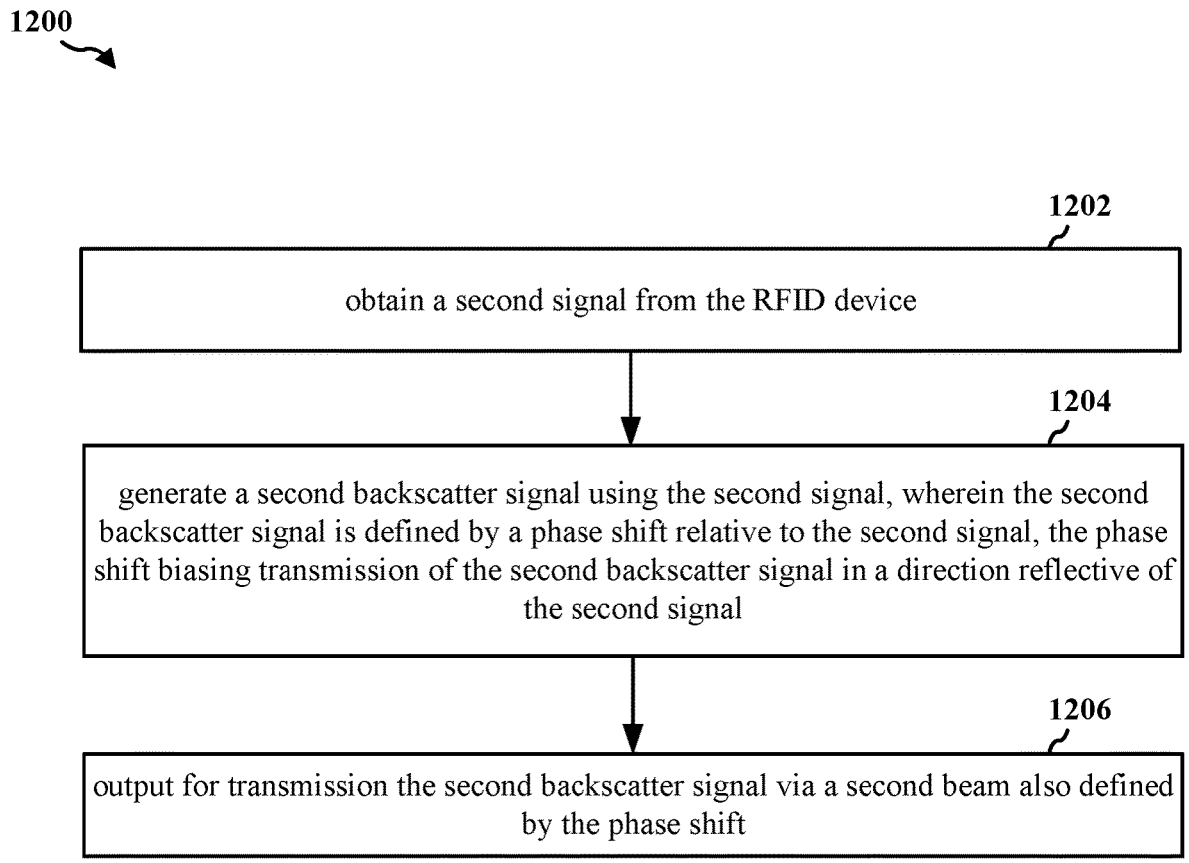
FIG. 12 is a flowchart of a method of wireless communication.

FIG. 12 is a flowchart 1200 of a method of wireless communication. The method may be performed by an RFID tag (e.g., the tag 504 of FIG. 5; the apparatus 1402). Any one or more of the steps of FIG. 12 may be performed in combination with any of the steps illustrated in FIGS. 9-12. At 1202, the tag may obtain a second signal from the RFID device, as illustrated in the third communication 810 of FIG. 8. For example, 1202 may be performed by the receiving component 1440 of FIG. 14.

At 1204, the tag may generate a second backscatter signal using the second signal, wherein the second backscatter signal is defined by a phase shift relative to the second signal, the phase shift biasing transmission of the second backscatter signal in a direction reflective of the second signal. For example, 1204 may be performed by the generating component 1446 of FIG. 14.

At 1206, the tag may output for transmission the second backscatter signal via a second beam also defined by the phase shift. For example, 1206 may be performed by the transmitting component 1442 of FIG. 14.

Figure 13:
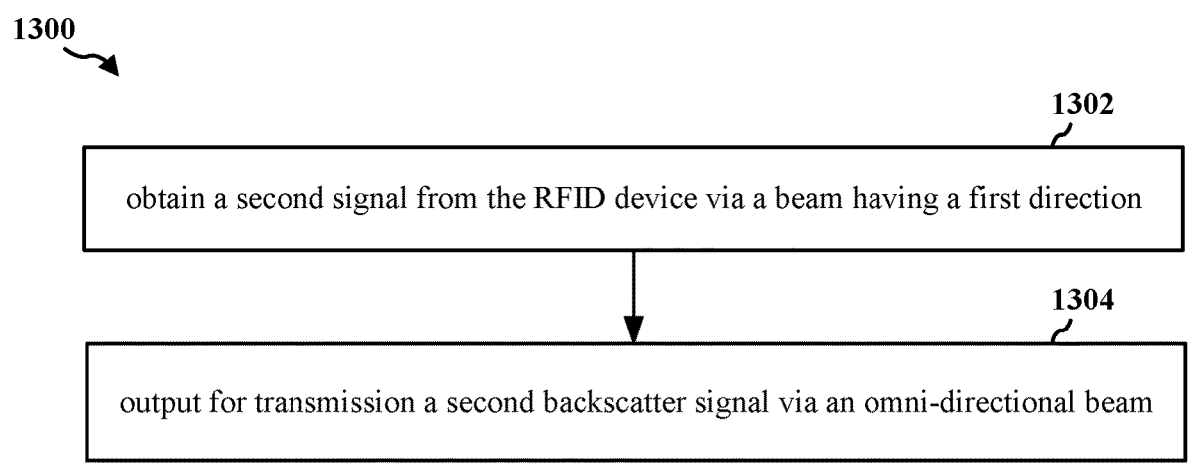
FIG. 13 is a flowchart of a method of wireless communication.

FIG. 13 is a flowchart 1300 of a method of wireless communication. The method may be performed by an RFID tag (e.g., the tag 504 of FIG. 5; the apparatus 1402). At 1302, the tag may obtain a second signal from the RFID device via a beam having a first direction, as illustrated in the third communication 810 of FIG. 8. For example, 1302 may be performed by the receiving component 1440 of FIG. 14.

At 1304, the tag may output for transmission a second backscatter signal via an omni-directional beam. For example, 1304 may be performed by the transmitting component 1442 of FIG. 14.

Figure 14:
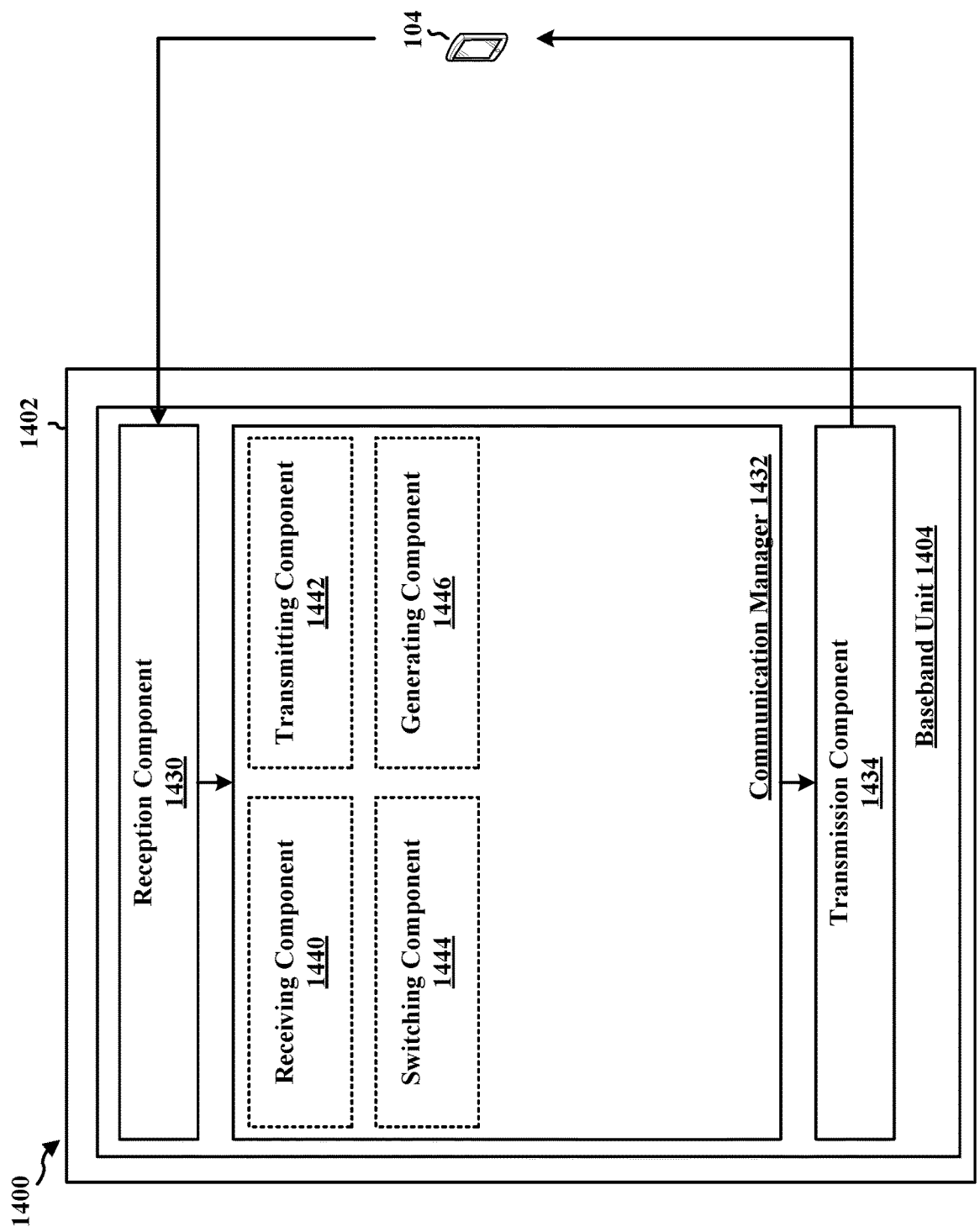
FIG. 14 is a diagram illustrating another example of a hardware implementation for another example apparatus.

FIG. 14 is a diagram 1400 illustrating an example of a hardware implementation for an apparatus 1402. The apparatus 1402 is an RFID tag and includes a baseband unit 1404. The baseband unit 1404 may communicate through a cellular RF transceiver with another RFID device. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404.

The communication manager 1432 includes a receiving component 1440 configured to: obtain a first signal from a radio frequency identifier (RFID) device; obtain, based on the first backscatter signal, signaling configured to indicate a particular beam index for a future backscatter signal; obtain, from the RFID device, a second signal configured to indicate a mode of backscattering, wherein the mode of backscattering comprises an indication of at least one of: a particular beamforming capability of the apparatus, a particular antenna panel of the apparatus, a data rate for a future backscatter signal, a signal strength measurement of the first backscatter signal, or a range requirement of the future backscatter signal; obtain, from the RFID device, a second signal configured to indicate a first beamforming capability; obtain, from the RFID device, a second signal configured to indicate a first antenna panel of the apparatus; obtain a second signal from the RFID device; obtain a second signal from the RFID device, the second signal received via a first beam having a first direction; obtain a second signal from the RFID device; e.g., as described in connection with FIGS. 8-13.

The communication manager 1432 further includes a transmitting component 1442 configured to output, for transmission to the RFID device in response to the first signal, a first backscatter signal configured to indicate a beamforming capability of the apparatus; output for transmission the second backscatter signal via a beam defined by the phase shift; output for transmission the second backscatter signal via a beam defined by the phase shift; output for transmission the second backscatter signal via a beam defined by the phase shift; output for transmission a second backscatter signal via an omni-directional beam; e.g., as described in connection with FIGS. 8-13.

The communication manager 1432 further includes a switching component 1444 configured to switch from a second beamforming capability to the first beamforming capability in response to the second signal; switch from a second antenna panel of the apparatus to the first antenna panel in response to the second signal; e.g., as described in connection with FIGS. 8-13.

The communication manager 1432 further includes a generating component 1446 configured to generate a second backscatter signal using the second signal, wherein the generation comprises applying a phase shift to the second backscatter signal; generate a second backscatter signal using the second signal, wherein the generation comprises applying a retro-directive phase shift to the second backscatter signal; and generate a second backscatter signal using the second signal, wherein the generation comprises applying a phase shift to the second backscatter signal, the phase shift biasing transmission of the second backscatter signal in a direction reflective of the second signal; e.g., as described in connection with FIGS. 8-13.

The apparatus may include additional components that perform each of the blocks of the algorithm in the aforementioned flowcharts of FIGS. 9-13. As such, each block in the aforementioned flowcharts of FIGS. 9-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for obtaining a first signal from a radio frequency identifier (RFID) device; means for outputting, for transmission to the RFID device in response to the first signal, a first backscatter signal configured to indicate a beamforming capability of the apparatus; means for obtaining, based on the first backscatter signal, signaling configured to indicate a particular beam index for a future backscatter signal; means for obtaining, from the RFID device, a second signal configured to indicate a mode of backscattering, wherein the mode of backscattering comprises an indication of at least one of: a particular beamforming capability of the apparatus, a particular antenna panel of the apparatus, a data rate for a future backscatter signal, a signal strength measurement of the first backscatter signal, or a range requirement of the future backscatter signal; means for obtaining, for transmission to the RFID device, a second backscatter signal using the mode of backscattering indicated in the obtained second signal; means for obtaining, from the RFID device, a second signal configured to indicate the first beamforming capability; means for switching from a second beamforming capability to the first beamforming capability in response to the second signal; means for obtaining a second signal from the RFID device; means for generating a second backscatter signal using the second signal, wherein the second backscatter signal is defined by a phase shift relative to the second signal; means for outputting for transmission the second backscatter signal; means for switching from a second antenna panel of the apparatus to the first antenna panel in response to the second signal; means for obtaining a second signal from the RFID device; means for generating a second backscatter signal using the second signal, wherein the second backscatter signal is defined by a phase shift relative to the second signal, the phase shift biasing transmission of the second backscatter signal in a direction reflective of the second signal; means for outputting for transmission the second backscatter signal via a second beam also defined by the phase shift; means for obtaining a second signal from the RFID device, the second signal received via a first beam having a first direction; means for generating a second backscatter signal using the second signal, wherein the generation comprises applying a retro-directive phase shift to the second backscatter signal; means for outputting for transmission the second backscatter signal via a beam defined by the phase shift; means for obtaining a second signal from the RFID device; means for generating a second backscatter signal using the second signal, wherein the generation comprises applying a phase shift to the second backscatter signal, the phase shift biasing transmission of the second backscatter signal in a direction reflective of the second signal; means for outputting for transmission the second backscatter signal via a beam defined by the phase shift; means for obtaining a second signal from the RFID device via a beam having a first direction; and means for outputting for transmission a second backscatter signal via an omni-directional beam; means for receiving, from the RFID device via the second antenna panel, a second signal configured to indicate the first antenna panel associated with the beamforming capability; and means for triggering a switch from the second antenna panel to the first antenna panel in response to the second signal.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
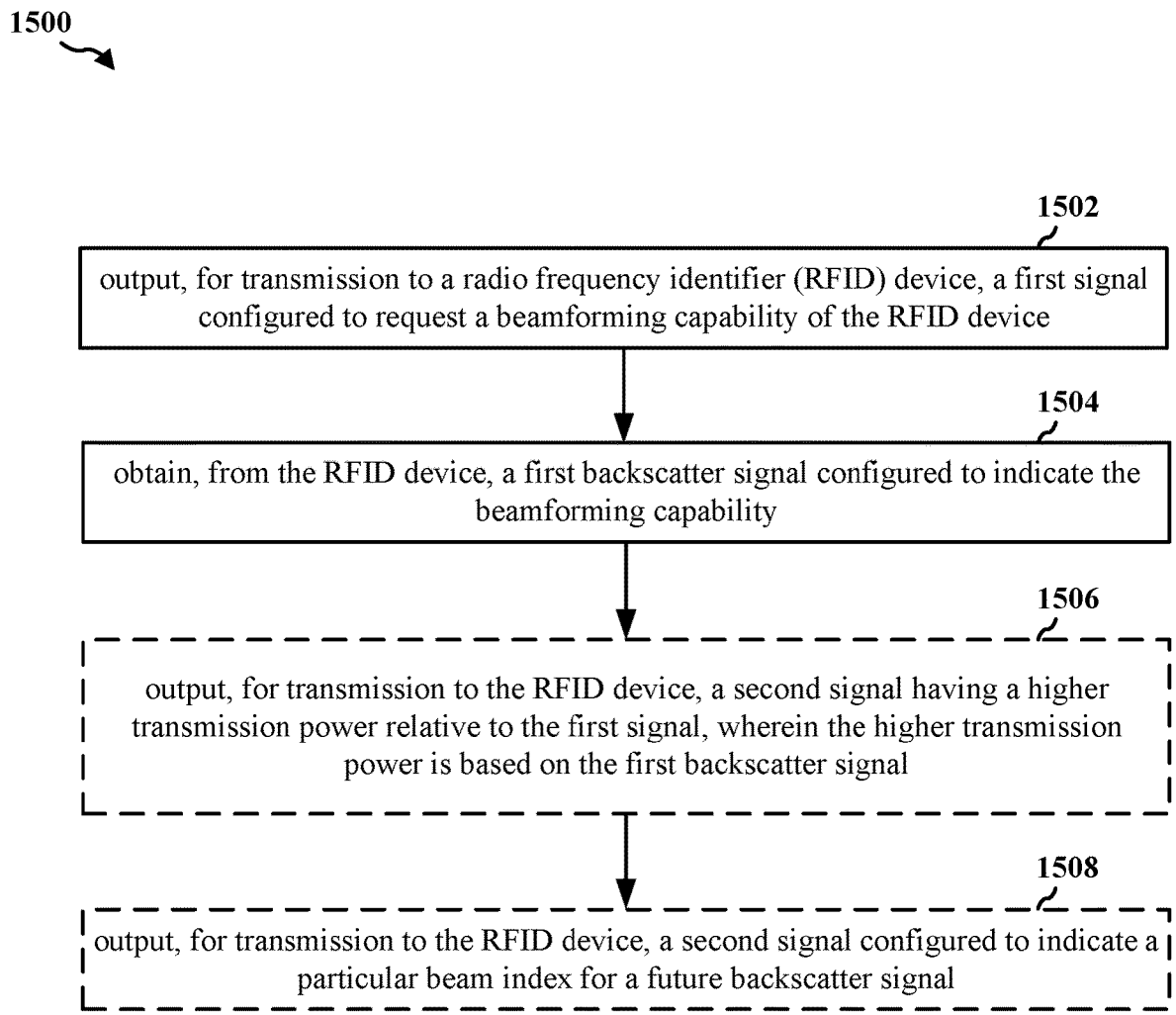
FIG. 15 is a flowchart of a method of wireless communication.

FIG. 15 is a flowchart 1500 of a method of wireless communication. The method may be performed by an RFID reader (e.g., the UE 104 or base station 102/180; the apparatus 1602). At 1502, the RFID reader is configured to output, for transmission to a radio frequency identifier (RFID) device, a first signal configured to request a beamforming capability of the RFID device. For example, 1502 may be performed by a transmitting component 1640. Here, the RFID reader may output a transmission (e.g., first communication 806 of FIG. 8) to the tag requesting feedback indicative of tag beamforming capabilities. For example, the first signal may include a CW signal and a command signal as illustrated in FIG. 6.

At 1504, the RFID reader is configured to obtain, from the RFID device, a first backscatter signal configured to indicate the beamforming capability. For example, the receiving component 1642 may receive a backscatter signal from the tag, wherein the backscatter signal (e.g., second communication 808 of FIG. 8) is responsive to the first signal, and provides the reader with an indication of the tags beamforming capabilities.

At 1506, the RFID reader may be configured to optionally output, for transmission to the RFID device, a second signal having a higher transmission power relative to the first signal, wherein the higher transmission power is based on the first backscatter signal. For example, 1506 may be performed by the transmitting component 1640. Here, the reader may determine to adjust its transmission power in future transmissions to the tag if the tag indicates that it has a low energy state, or the first signal requested the tag switch beamforming modes and/or antenna panels for measurement purposes.

At 1508, the RFID reader may be configured to optionally output, for transmission to the RFID device, a second signal configured to indicate a particular beam index for a future backscatter signal. For example, 1508 may be performed by the transmitting component 1640. Here, the reader may identify a particular beam, and transmit an indication of the beam to the tag. The tag may then use the identified beam for future backscatter transmissions to the reader.

In certain aspects, wherein the beamforming capability is indicative of at least one antenna element of a number of antenna elements or a number of antenna panels associated with the apparatus, wherein each of the antenna panels comprises at least one antenna element.

In certain aspects, the beamforming capability comprises an antenna panel report of the apparatus.

In certain aspects, the antenna panel report comprises an indication of a first antenna panel configured for a first beamforming capability and a second antenna panel configured for a second beamforming capability.

In certain aspects, the beamforming capability comprises a recommended beamforming capability for a future backscatter signal, and wherein the recommended beamforming capability is based on one or more communication metrics of the RFID device.

In certain aspects, the one or more communication metrics include a power state of the apparatus or a measured energy level of the first signal.

Figure 16:
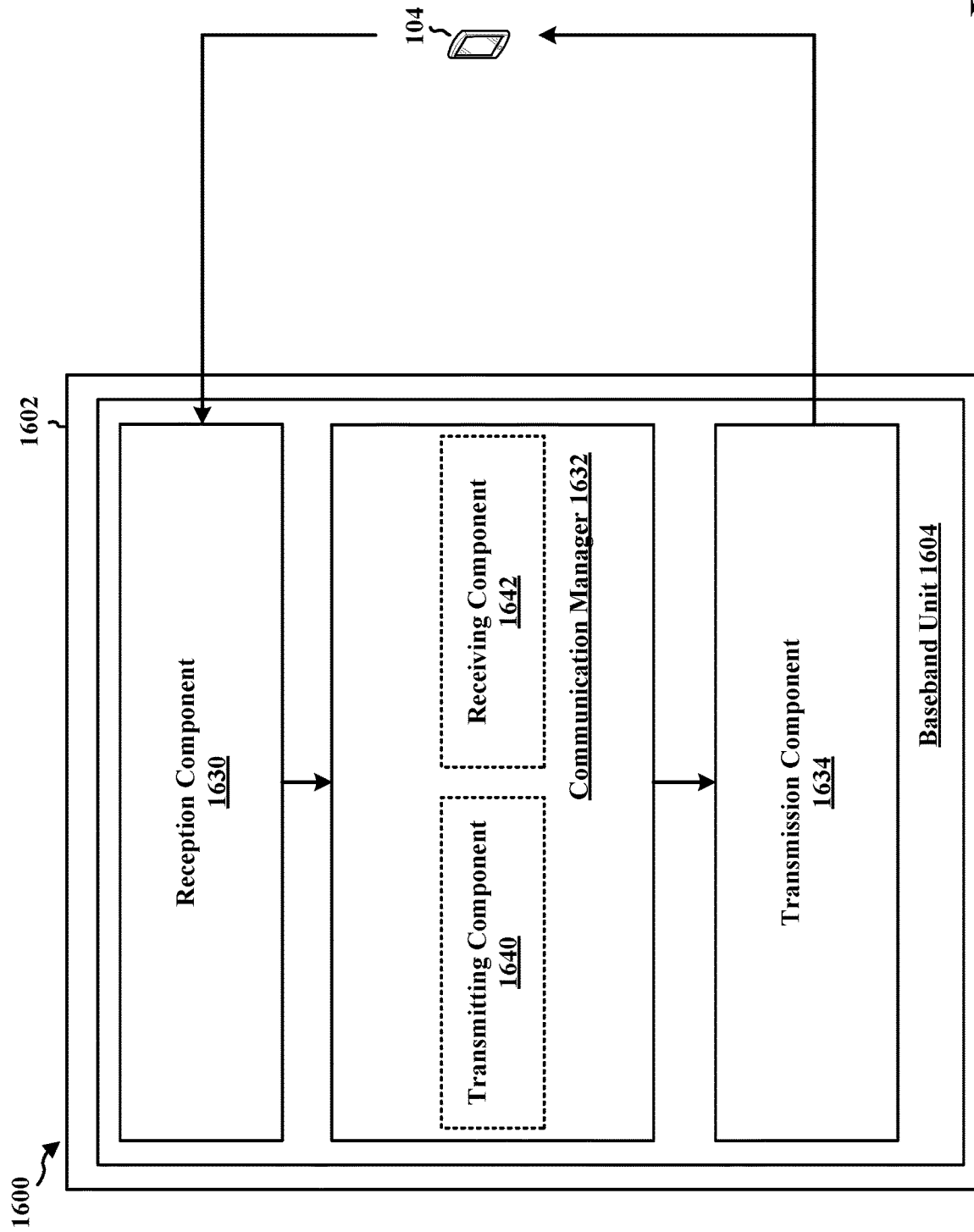
FIG. 16 is a diagram illustrating another example of a hardware implementation for another example apparatus.

FIG. 16 is a diagram 1600 illustrating an example of a hardware implementation for an apparatus 1602. The apparatus 1602 may be implemented as a BS, UE, IAB-node, repeater, etc. configured as an RFID reader that includes a baseband unit 1604. The baseband unit 1604 may communicate through a cellular RF transceiver with an RFID tag and any other suitable network nodes. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 310 and may include the memory 376 and/or at least one of the TX processor 316, the RX processor 370, and the controller/processor 375.

The communication manager 1632 includes a transmitting component 1640 configured for outputting, for transmission to a radio frequency identifier (RFID) tag, a first signal configured to request a beamforming capability of the RFID tag; outputting, for transmission to the RFID tag, a second signal having a higher transmission power relative to the first signal, wherein the higher transmission power is based on the first backscatter signal; and outputting, for transmission to the RFID tag, a second signal configured to indicate a particular beam index for a future backscatter signal, e.g., as described in connection with 1502, 1506, and 1508 of FIG. 15.

The communication manager 1632 further includes a receiving component 1642 configured to output, for transmission to the RFID tag, a second signal having a higher transmission power relative to the first signal, wherein the higher transmission power is based on the first backscatter signal; e.g., as described in connection with 1506.

The apparatus may include additional components that perform each of the blocks of the algorithm in the aforementioned flowchart of FIG. 15. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for outputting, for transmission to a radio frequency identifier (RFID) tag, a first signal configured to request a beamforming capability of the RFID tag; means for obtaining, from the RFID tag, a first backscatter signal configured to indicate the beamforming capability; means for outputting, for transmission to the RFID tag, a second signal having a higher transmission power relative to the first signal, wherein the higher transmission power is based on the first backscatter signal; means for outputting, for transmission to the RFID tag, a second signal configured to indicate a particular beam index for a future backscatter signal.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

Means for receiving or means for obtaining may include a receiver (such as the receive processor 356/370) or an antenna(s) 320/352 of the BS 310 or UE 350 illustrated in FIG. 3. Means for transmitting or means for outputting may include a transmitter (such as the transmit processor 316/368) or an antenna(s) 320/352 of the BS 310 or UE 350 illustrated in FIG. 3. Means for switching, means for triggering a switch, means for generating, means for determining, and/or means for performing may include a processing system, which may include one or more processors, such as the receive processor 370/356, the transmit processor 316/368, the TX MIMO processor 318/354, or the controller 375/359 of the BS 110 and the UE 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method for wireless communication by an first radio frequency identifier (RFID) device, comprising: obtaining a first signal from a second RFID device; and outputting, for transmission to the second RFID device in response to the first signal, a first backscatter signal configured to indicate a beamforming capability of the first RFID device.

Example 2 is the method of example 1, wherein the beamforming capability is indicative of at least one of a mono-static beamforming capability or a bi-static capability.

Example 3 is the method of any of examples 1 and 2, wherein the method further comprises: obtaining, based on the first backscatter signal, signaling configured to indicate a particular beam index for a future backscatter signal.

Example 4 is the method of any of examples 1-3, wherein the beamforming capability is indicative of at least one of a number of antenna elements or a number of antenna panels associated with the first RFID device, wherein each of the antenna panels comprises at least one antenna element.

Example 5 is the method of any of examples 1-4, wherein the beamforming capability comprises an antenna panel report of the first RFID device.

Example 6 is the method of example 5, wherein the antenna panel report comprises an indication of a first antenna panel configured for a first beamforming capability and a second antenna panel configured for a second beamforming capability.

Example 7 is the method of any of examples 1-6, wherein the beamforming capability comprises a recommended beamforming capability for a future backscatter signal, and wherein the recommended beamforming capability is based on one or more communication metrics of the first RFID device.

Example 8 is the method of example 7, wherein the one or more communication metrics include a power state of the first RFID device or a measured energy level of the first signal.

Example 9 is the method of any of examples 1-8, wherein the method further comprises: obtaining, from the second RFID device, a second signal configured to indicate a mode of backscattering, wherein the mode of backscattering comprises an indication of at least one of: a particular beamforming capability of the first RFID device, a particular antenna panel of the first RFID device, a data rate for a future backscatter signal, a signal strength measurement of the first backscatter signal, or a range requirement of the future backscatter signal; and outputting, for transmission to the second RFID device, a second backscatter signal using the mode of backscattering indicated in the obtained second signal.

Example 10 is the method of any of examples 1-9, wherein the beamforming capability is a first beamforming capability, and wherein the method further comprises: obtaining, from the second RFID device, a second signal configured to indicate the first beamforming capability; and switching from a second beamforming capability to the first beamforming capability in response to the second signal.

Example 11 is the method of any of examples 1-10, wherein the method further comprises: obtaining a second signal from the second RFID device; generating a second backscatter signal using the second signal, wherein the second backscatter signal is defined by a phase shift relative to the second signal; and outputting for transmission the second backscatter signal.

Example 12 is the method of example 11, wherein the second signal comprises an indication of a beam index, and wherein the phase shift is based on the beam index.

Example 13 is the method of any of examples 1-12, wherein the method further comprises: obtaining a second signal from the second RFID device, wherein the second signal was obtained via a first beam associated with a first direction; generating a second backscatter signal using the second signal, wherein the second backscatter signal is defined by a retro-directive phase shift relative to the second signal; and outputting for transmission the second backscatter signal via a second beam also associated with the first direction.

Example 14 is the method of any of examples 1-13, wherein the method further comprises: obtaining a second signal from the second RFID device; generating a second backscatter signal using the second signal, wherein the second backscatter signal is defined by a phase shift relative to the second signal, the phase shift biasing transmission of the second backscatter signal in a direction reflective of the second signal; and outputting for transmission the second backscatter signal via a second beam also defined by the phase shift.

Example 15 is a method for wireless communication by a first radio frequency identifier (RFID) device, comprising: outputting, for transmission to a second RFID device, a first signal configured to request a beamforming capability of the second RFID device; and obtaining, from the second RFID device, a first backscatter signal configured to indicate the beamforming capability.

Example 16 is the method of example 15, wherein the method further comprises: outputting, for transmission to the second RFID device, a second signal having a higher transmission power relative to the first signal, wherein the higher transmission power is based on the first backscatter signal.

Example 17 is the method of any of examples 15 and 16, wherein the method further comprises: outputting, for transmission to the second RFID device, a second signal configured to indicate a particular beam index for a future backscatter signal.

Example 18 is the method of any of examples 15-17, wherein the beamforming capability is indicative of at least one antenna element of a number of antenna elements or a number of antenna panels associated with the first RFID device, wherein each of the antenna panels comprises at least one antenna element.

Example 19 is the method of any of examples 15-18, wherein the beamforming capability comprises an antenna panel report of the first RFID device.

Example 20 is the method of example 19, wherein the antenna panel report comprises an indication of a first antenna panel configured for a first beamforming capability and a second antenna panel configured for a second beamforming capability.

Example 21 is the method of any of examples 15-20, wherein the beamforming capability comprises a recommended beamforming capability for a future backscatter signal, and wherein the recommended beamforming capability is based on one or more communication metrics of the second RFID device.

Example 22 is the method of any of examples 15-21, wherein the one or more communication metrics include a power state of the first RFID device or a measured energy level of the first signal.

Example 23 is an RFID device, comprising: a transceiver; a memory comprising instructions; and one or more processors configured to execute the instructions to cause the RFID device to perform a method in accordance with any one of examples 1-14, wherein the transceiver is configured to: receive a first signal from an RFID device; and transmit, to the RFID device in response to the first signal, a first backscatter signal configured to indicate a beamforming capability of the RFID device.

Example 24 is an RFID device, comprising: a transceiver; a memory comprising instructions; and one or more processors configured to execute the instructions and cause the RFID device to perform a method in accordance with any one of examples 15-22, wherein the transceiver is configured to: transmit, to another RFID device, a first signal configured to request a beamforming capability of the other RFID device; and receive, from the other RFID device, a first backscatter signal configured to indicate the beamforming capability.

Example 25 is an apparatus for wireless communications, comprising means for performing a method in accordance with any one of examples 1-14.

Example 26 is an apparatus for wireless communications, comprising means for performing a method in accordance with any one of examples 15-22.

Example 27 is a non-transitory computer-readable medium comprising instructions that, when executed by an apparatus, cause the apparatus to perform a method in accordance with any one of examples 1-14.

Example 28 is a non-transitory computer-readable medium comprising instructions that, when executed by an apparatus, cause the apparatus to perform a method in accordance with any one of examples 15-22.

Example 29 is an apparatus for wireless communications, comprising: a memory comprising instructions; and one or more processors configured to execute the instructions to cause the apparatus to perform a method in accordance with any one of examples 1-14.

Example 30 is apparatus for wireless communications, comprising: a memory comprising instructions; and one or more processors configured to execute the instructions to cause the apparatus to perform a method in accordance with any one of examples 15-22.

What is claimed is:

1. An apparatus configured for wireless communication, comprising:
a memory comprising instructions; and
one or more processors configured to execute the instructions and cause the apparatus to:
obtain a first signal from a radio frequency identifier (RFID) device; and
output, for transmission to the RFID device in response to the first signal, a first backscatter signal configured to indicate a beamforming capability of the apparatus.

2. The apparatus of claim 1, wherein the beamforming capability is indicative of at least one of a mono-static beamforming capability or a bi-static capability.

3. The apparatus of claim 1, wherein the one or more processors are further configured to cause the apparatus to:
obtain, based on the first backscatter signal, signaling configured to indicate a particular beam index for a future backscatter signal.

4. The apparatus of claim 1, wherein the beamforming capability is indicative of at least one of a number of antenna elements or a number of antenna panels associated with the apparatus, wherein each of the antenna panels comprises at least one antenna element.

5. The apparatus of claim 1, wherein the beamforming capability comprises an antenna panel report of the apparatus.

6. The apparatus of claim 5, wherein the antenna panel report comprises an indication of a first antenna panel configured for a first beamforming capability and a second antenna panel configured for a second beamforming capability.

7. The apparatus of claim 1, wherein the beamforming capability comprises a recommended beamforming capability for a future backscatter signal, and wherein the recommended beamforming capability is based on one or more communication metrics of the apparatus.

8. The apparatus of claim 7, wherein the one or more communication metrics include a power state of the apparatus or a measured energy level of the first signal.

9. The apparatus of claim 1, wherein the one or more processors are further configured to cause the apparatus to:
obtain, from the RFID device, a second signal configured to indicate a mode of backscattering, wherein the mode of backscattering comprises an indication of at least one of: a particular beamforming capability of the apparatus, a particular antenna panel of the apparatus, a data rate for a future backscatter signal, a signal strength measurement of the first backscatter signal, or a range requirement of the future backscatter signal; and
output, for transmission to the RFID device, a second backscatter signal using the mode of backscattering indicated in the obtained second signal.

10. The apparatus of claim 1, wherein the beamforming capability is a first beamforming capability, and wherein the one or more processors are further configured to cause the apparatus to:
obtain, from the RFID device, a second signal configured to indicate the first beamforming capability; and
switch from a second beamforming capability to the first beamforming capability in response to the second signal.

11. The apparatus of claim 1, wherein the one or more processors are further configured to cause the apparatus to:
obtain a second signal from the RFID device;
generate a second backscatter signal using the second signal, wherein the second backscatter signal is defined by a phase shift relative to the second signal; and
output for transmission the second backscatter signal.

12. The apparatus of claim 11, wherein the second signal comprises an indication of a beam index, and wherein the phase shift is based on the beam index.

13. The apparatus of claim 1, wherein the one or more processors are further configured to cause the apparatus to:
   obtain a second signal from the RFID device, wherein the second signal was obtained via a first beam associated with a first direction;
   generate a second backscatter signal using the second signal, wherein the second backscatter signal is defined by a retro-directive phase shift relative to the second signal; and
   output for transmission the second backscatter signal via a second beam also associated with the first direction.

14. The apparatus of claim 1, wherein the one or more processors are further configured to cause the apparatus to:
   obtain a second signal from the RFID device;
   generate a second backscatter signal using the second signal, wherein the second backscatter signal is defined by a phase shift relative to the second signal, the phase shift biasing transmission of the second backscatter signal in a direction reflective of the second signal; and
   output for transmission the second backscatter signal via a second beam also defined by the phase shift.

15. A radio frequency identifier (RFID) tag comprising:
   a transceiver;
   a memory comprising instructions; and
   one or more processors configured to execute the instructions and cause the RFID tag to:
      receive, via the transceiver, a first signal from an RFID device; and
      transmit, via the transceiver and in response to the first signal, a first backscatter signal to the RFID device, said backscatter signal being configured to indicate a beamforming capability of the RFID tag.

16. The RFID tag of claim 15, further comprising a first antenna panel and a second antenna panel, wherein the one or more processors are further configured to cause the RFID tag to:
   receive, from the RFID device via the second antenna panel, a second signal configured to indicate the first antenna panel associated with the beamforming capability; and
   trigger a switch from the second antenna panel to the first antenna panel in response to the second signal.

17. The RFID tag of claim 16, wherein at least one of:
   each of the first and second antenna panels is configured to receive beamformed signaling from the RFID device, or
   the second antenna panel is associated with another beamforming capability.

18. An apparatus configured for wireless communication, comprising:
   a memory comprising instructions; and
   one or more processors configured to execute the instructions and cause the apparatus to:
      output, for transmission to a radio frequency identifier (RFID) device, a first signal configured to request a beamforming capability of the RFID device; and
      obtain, from the RFID device, a first backscatter signal configured to indicate the beamforming capability.

19. The apparatus of claim 18, wherein the one or more processors are further configured to cause the apparatus to:
   output, for transmission to the RFID device, a second signal having a higher transmission power relative to the first signal, wherein the higher transmission power is based on the first backscatter signal.

20. The apparatus of claim 18, wherein the one or more processors are further configured to cause the apparatus to:
   output, for transmission to the RFID device, a second signal configured to indicate a particular beam index for a future backscatter signal.

21. The apparatus of claim 18, wherein the beamforming capability is indicative of at least one antenna element of a number of antenna elements or a number of antenna panels associated with the apparatus, wherein each of the antenna panels comprises at least one antenna element.

22. The apparatus of claim 18, wherein the beamforming capability comprises an antenna panel report of the apparatus.

23. The apparatus of claim 22, wherein the antenna panel report comprises an indication of a first antenna panel configured for a first beamforming capability and a second antenna panel configured for a second beamforming capability.

24. The apparatus of claim 18, wherein the beamforming capability comprises a recommended beamforming capability for a future backscatter signal, and wherein the recommended beamforming capability is based on one or more communication metrics of the RFID device.

25. The apparatus of claim 24, wherein the one or more communication metrics include a power state of the apparatus or a measured energy level of the first signal.

26. The apparatus of claim 18 further comprising a transceiver configured to:
   transmit the first signal; and
   receive the first backscatter signal, wherein the apparatus is configured as an RFID reader.

* * * * *